United States Patent [19]
Larsen

[11] 3,899,775
[45] Aug. 12, 1975

[54] AUTOMATIC STORE TRANSACTION SYSTEM AND TERMINAL THEREFOR

[75] Inventor: John M. Larsen, Bellflower, Calif.

[73] Assignee: MSI Data Corporation, Costa Mesa, Calif.

[22] Filed: Apr. 13, 1973

[21] Appl. No.: 351,087

[52] U.S. Cl. .......................... 340/172.5; 340/150
[51] Int. Cl. ....... G06f 15/20; G06f 3/04; H04q/5/00
[58] Field of Search .............. 340/172.5, 149 R, 340/152 R, 150, 149 A, 167, 408, 147 SY; 179/15 AL, 2 DP; 235/1 R, 2, 7 R, 30 R, 145 R, 92 DP; 178/68, 69.5

[56] References Cited
UNITED STATES PATENTS

| | | | |
|---|---|---|---|
| 3,308,439 | 3/1967 | Tink et al. | 340/172.5 |
| 3,380,031 | 4/1968 | Clayton et al. | 340/172.5 |
| 3,407,387 | 10/1968 | Looschen et al. | 340/152 |
| 3,469,243 | 9/1969 | Wilcox et al. | 340/172.5 |
| 3,505,646 | 4/1970 | Affel | 340/172.5 |
| 3,517,130 | 6/1970 | Rynders | 179/15 |
| 3,571,802 | 3/1971 | Serra | 340/172.5 |
| 3,581,072 | 5/1971 | Nymeyer | 235/152 |
| 3,588,838 | 6/1971 | Felcheck | 340/172.5 |
| 3,596,254 | 7/1971 | Highleyman | 340/172.5 |
| 3,596,256 | 7/1971 | Alpert et al. | 340/172.5 |
| 3,631,403 | 12/1971 | Asbo et al. | 340/172.5 |
| 3,657,702 | 4/1972 | Stephenson | 340/149 R |
| 3,665,417 | 5/1972 | Low et al. | 340/172.5 |
| 3,694,811 | 9/1972 | Wood | 340/152 R |
| 3,718,762 | 2/1973 | Nezy et al. | 178/68 |
| 3,719,927 | 3/1973 | Michels | 340/149 R |
| 3,747,067 | 7/1973 | Fox et al. | 340/147 SY |
| 3,748,452 | 7/1973 | Ruben | 235/168 |

*Primary Examiner*—Gareth D. Shaw
*Assistant Examiner*—James D. Thomas
*Attorney, Agent, or Firm*—Christie, Parker & Hale

[57] ABSTRACT

An automatic store transaction system controlled by a retrieval data processor. The system includes a plurality of electronic transaction terminals that may be used at the check-out stands for a supermarkets for recording store transactions and generating binary data signals representative thereof. The data processor and transaction terminals are linked by a three-wire transmission line for transmitting data signals therebetween. The retrieval processor and each terminal is coupled to an individual transceiver for handling and controlling the data signals between a terminal and the retrieval processor for completing a transaction at the terminal.

14 Claims, 13 Drawing Figures

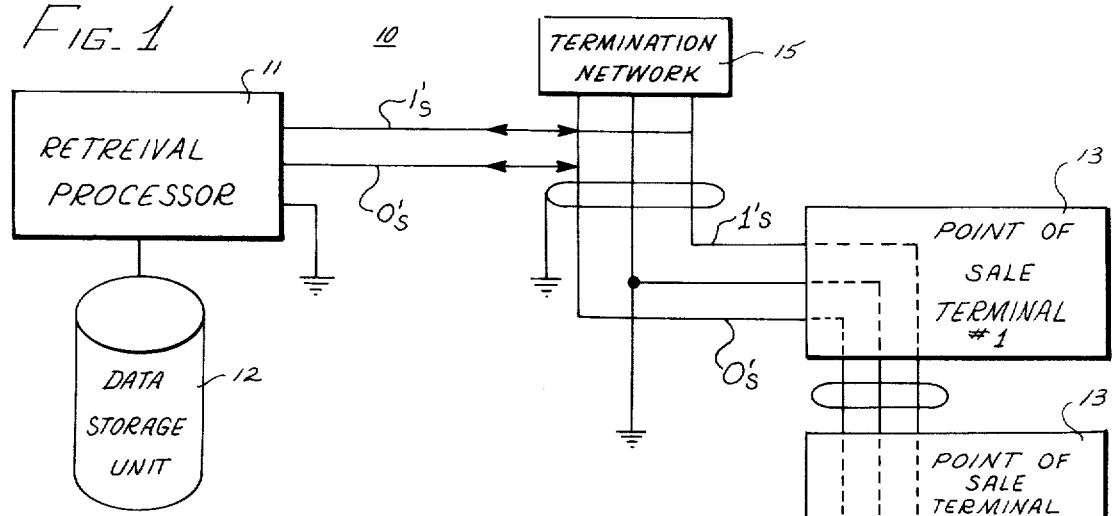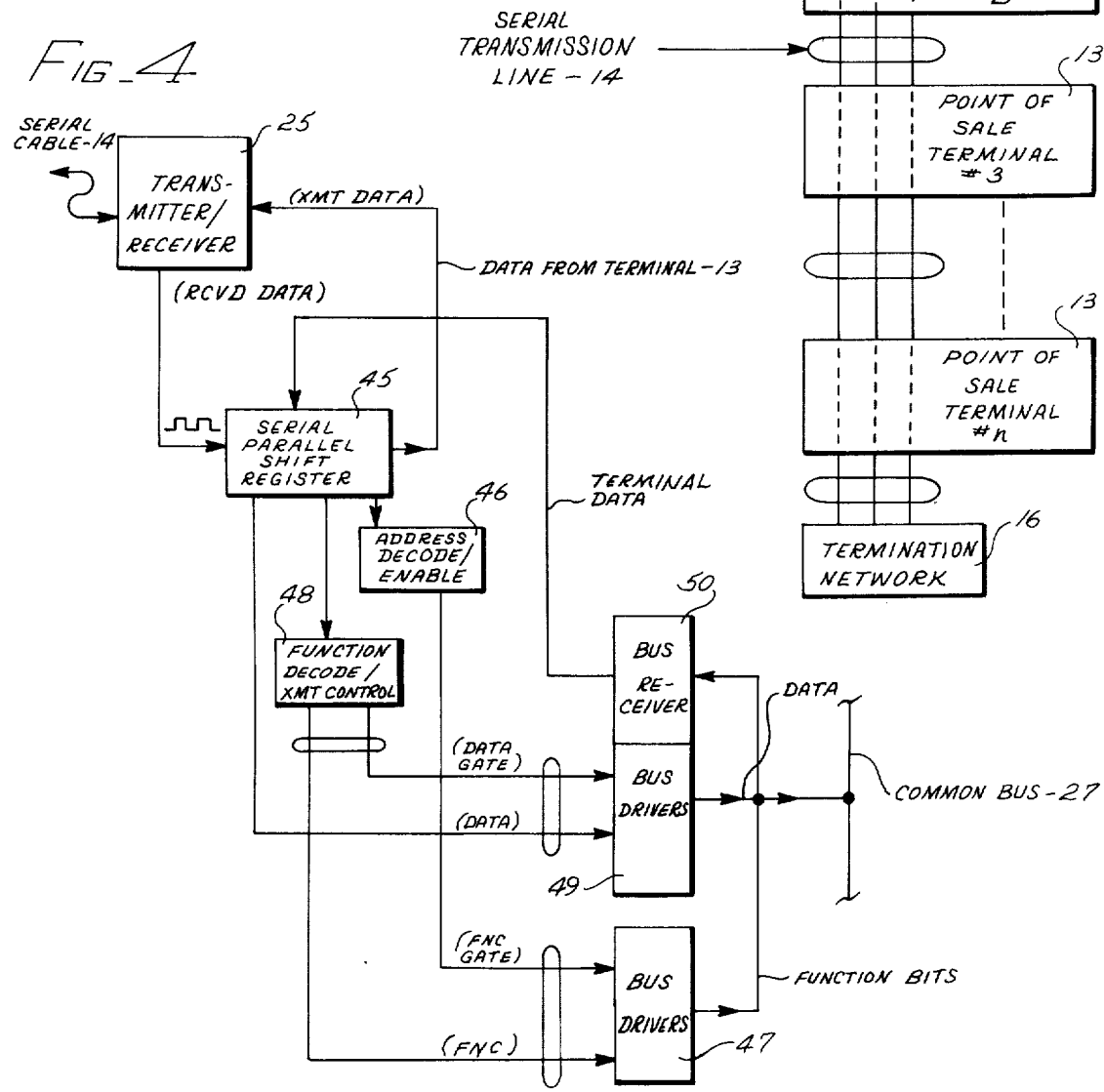

X = DELIMITER KEYS

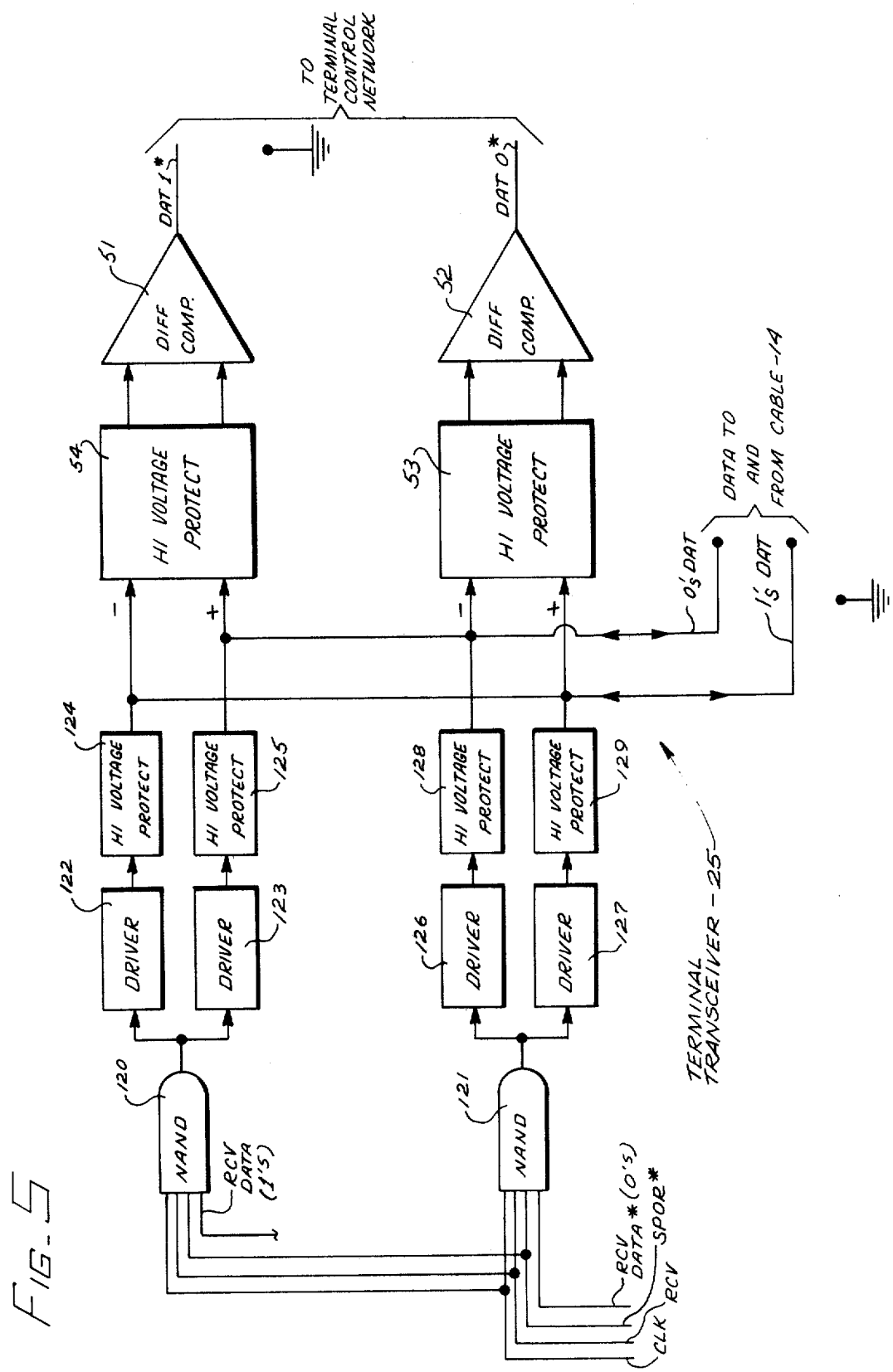

Fig. 6
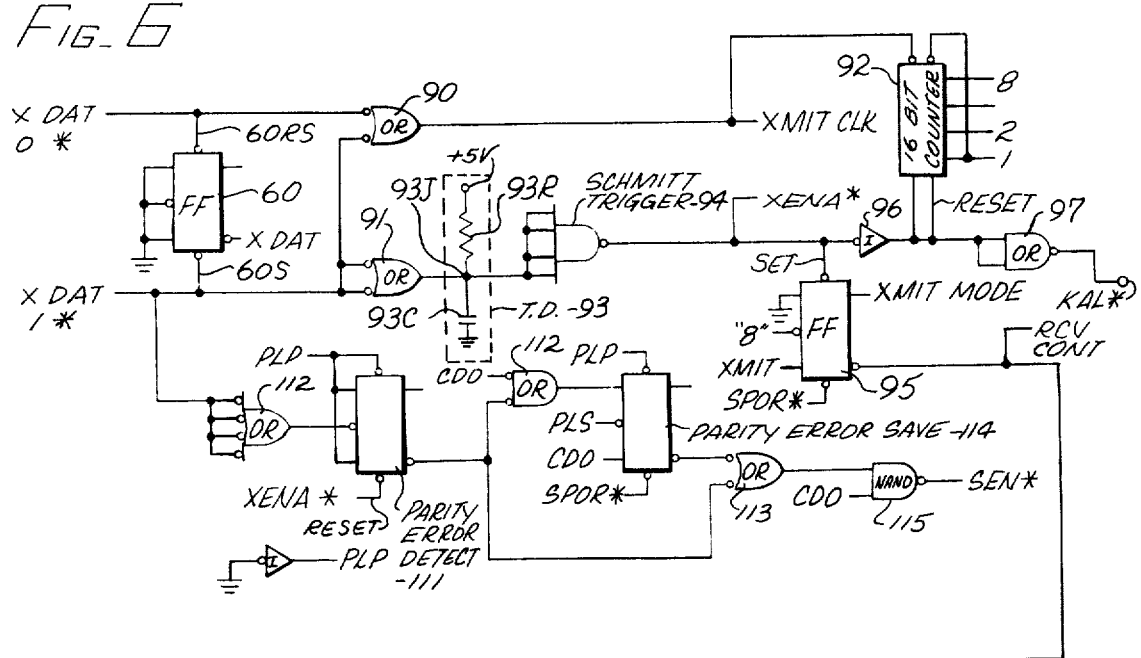
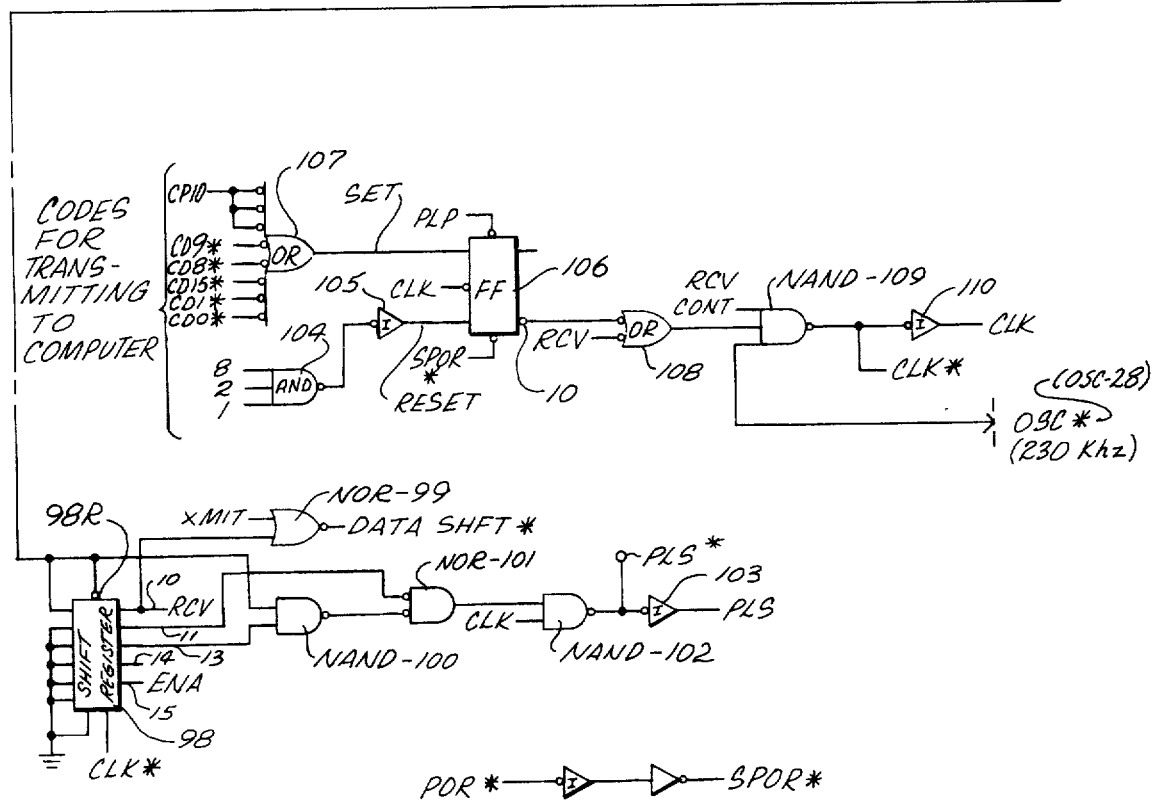

FIG_8

Fig_11

AUTOMATIC STORE TRANSACTION SYSTEM AND TERMINAL THEREFOR

This invention relates to an automatic store transaction system or point of sales system for retail outlets and the like and electronic transaction terminals therefor.

At the present time there is in use various types of data collection or acquisition systems for accummulating and recording data. The collected data is generally transmitted to a central computer for processing. One type of data collection system that has been developed for retail outlets and the like is a portable data collection device that is being used for inventory control for retail outlets such as supermarkets. One such data collection system is described in the copending patent appliation bearing Ser. No. 135,345, now U.S. Pat. No. 3,771,132 granted on Nov. 6, 1973, and assigned to the same assignee as the present invention. In addition, electronic point of sales or store transaction systems have also been developed and placed into operation. Most automatic store transaction systems developed to date have been directed to use in retail department stores as contrasted with supermarket outlets since they are relatively simple to implement. Such point of sales systems have been used in high volume retail outlets such as supermarkets with limited success. The automatic store transaction systems for use in a supermarket, for example, would replace the present day point of sales systems having mechanical transaction terminals. The automatic store transaction system generally comprises a pluraity of transaction terminals, one at each check stand for recording and processing each customer's transactions or purchases. All of the transaction terminals may be coupled to a data processor for handling and processing the data entered into the transaction terminal by the store clerk. These automatic systems not only speed up the check stand operation and improve the over-all store operations but they are advantageous since they are capable of producing a variety of management reports on items such as inventory, sales rates, and checker productivity.

The present invention provides an improved automatic store transaction system particularly adapted for high volume retail outlets such as supermarkets. The automatic store transaction system comprehended by the present invention allows a plurality of electronic transaction terminals to be located at a conventional check-out stand in a supermarket with the data processor located in a remote location away from the store operations proper. The transaction system includes an improved method of transmitting data signals from a transaction terminal to a remote data processor without resorting to the use of a coaxial cable and thereby eliminates all of the assembly problems of using such a tranmission system. The balanced transmission line employed in the present system also isolates the transmitted signals from radiated RF (radio frequency) energy which is a particular problem in a supermarket environment and the like. The improved system of the present invention can be adapted to allow all of the items purchased by a customer to be identified by a product code wherein the check-out clerk merely enters the product code into the transaction terminal and all of the transaction operations are automatically controlled by means of the data processor signals transmitted between the processor and the terminals and displayed for the customer's convenience. The transaction terminals may produce a printed record of the transactions as well as the electronic entry device of each item on a current basis. This electronic entry device may include a scale for weighing produce items and the like and transmit the weight signals to the processor for calculating the total price of the items and then displaying the amount of the weight and total cost to the customer as well as printing out the transaction. The terminal may also be advantageously adapted for controlling the cash drawer of the terminal and include a velocity keyboard for high volume items that may be entered directly into the computer rather than through the conventional keyboard arrangement. The terminal may also include a check writer that is controlled through the data processor for printing out the necessary dollar amounts, payee, and endorsing the check when the transaction is completed.

From a structural standpoint, the present invention comprehends an automatic store transaction system comprising a retrieval data processor having preselected accessible information recorded therein and capable of executing selected operations on the transaction information. A data transceiver is coupled to the retrieval processor for bidirectionally transmitting data to and from the data processor. A plurality of transaction terminals may be located at a remote location with respect to a backroom location for the data processor.

The transaction terminals are located at the check-out stands for the store. The terminals are adapted for generating and receiving binary coded signals and operating on the binary coded signals. Each transaction terminal includes an individual data transceiver coupled to bidirectionally control the transfer of binary coded signals to and from the individual transaction terminal. Means for serially and bidirectionally transmitting binary coded signals between the data processor and the transaction terminals through the individual data transceivers coupled to an individual terminal are also provided. The binary coded signals transmitted from the data processor include terminal identification signals, terminal function signals and data signals for selecting one of the transaction terminals to be activated and controlling a preselected function of the terminal at the selected terminal including controlling the transmission of the terminal generated binary coded signals from the terminal to the data processor for completing the transaction. Each of the terminals include circuit means for responding to an individual terminal identification signal for activating the individual terminal for processing the terminal generated data signals and the received binary coded signals and completing the transaction.

The transmission means for the store transaction system may comprise a single cable comprising a 3-wire balanced transmission line system coupled between the processor transceiver and each of the individual transceivers for the transaction terminals.

These and other features of the present invention may be more fully appreciated when considered in the light of the following specification and drawings, in which:

FIG. 1 is a block diagram of the automatic store transaction system embodying the present invention;

FIG. 4 is a block diagram of the input portion of a transaction terminal;

FIG. 5 is a block diagram of the input circuitry of the transceiver for an electronic terminal;

Figure 7:
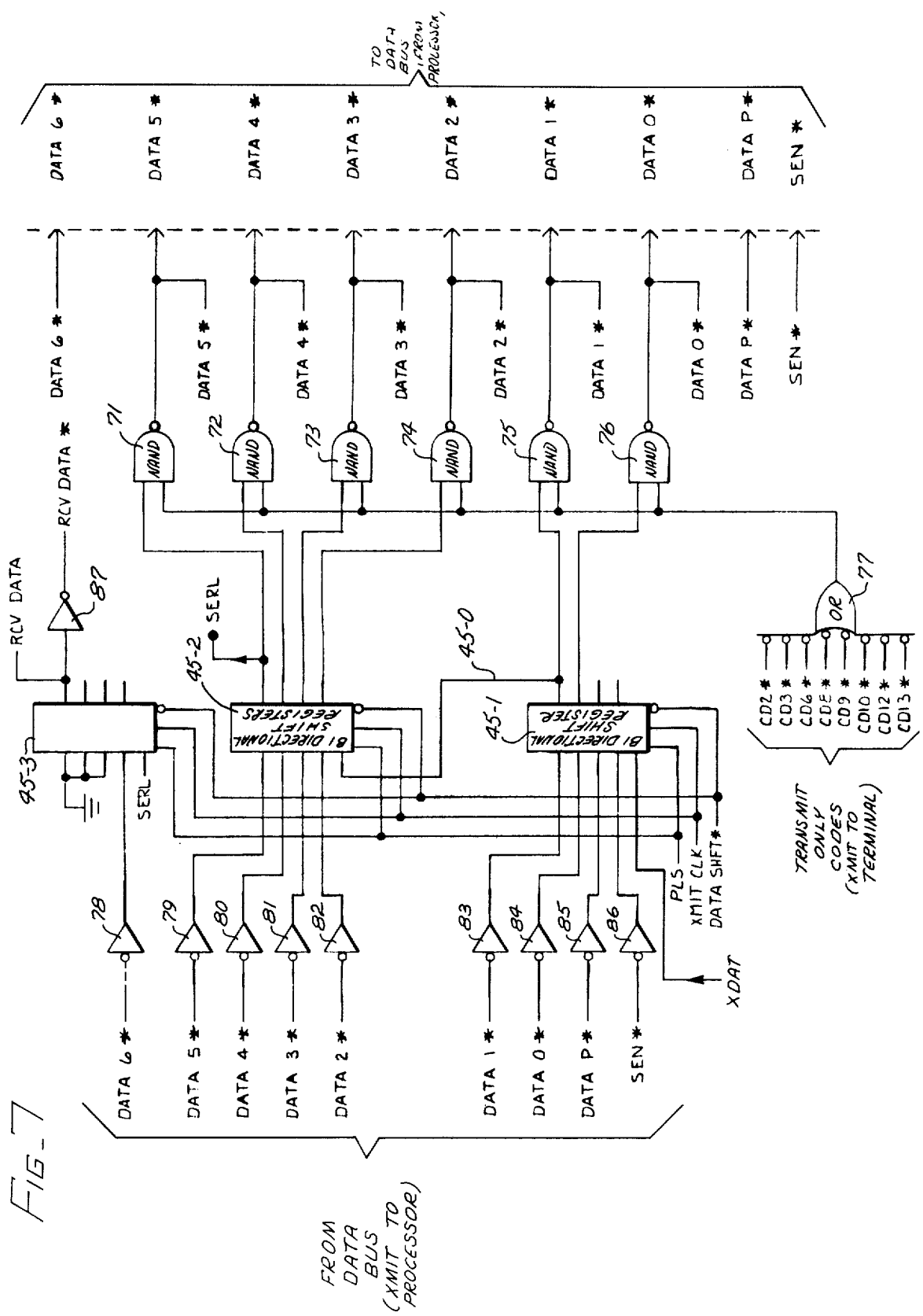
Figure 8:
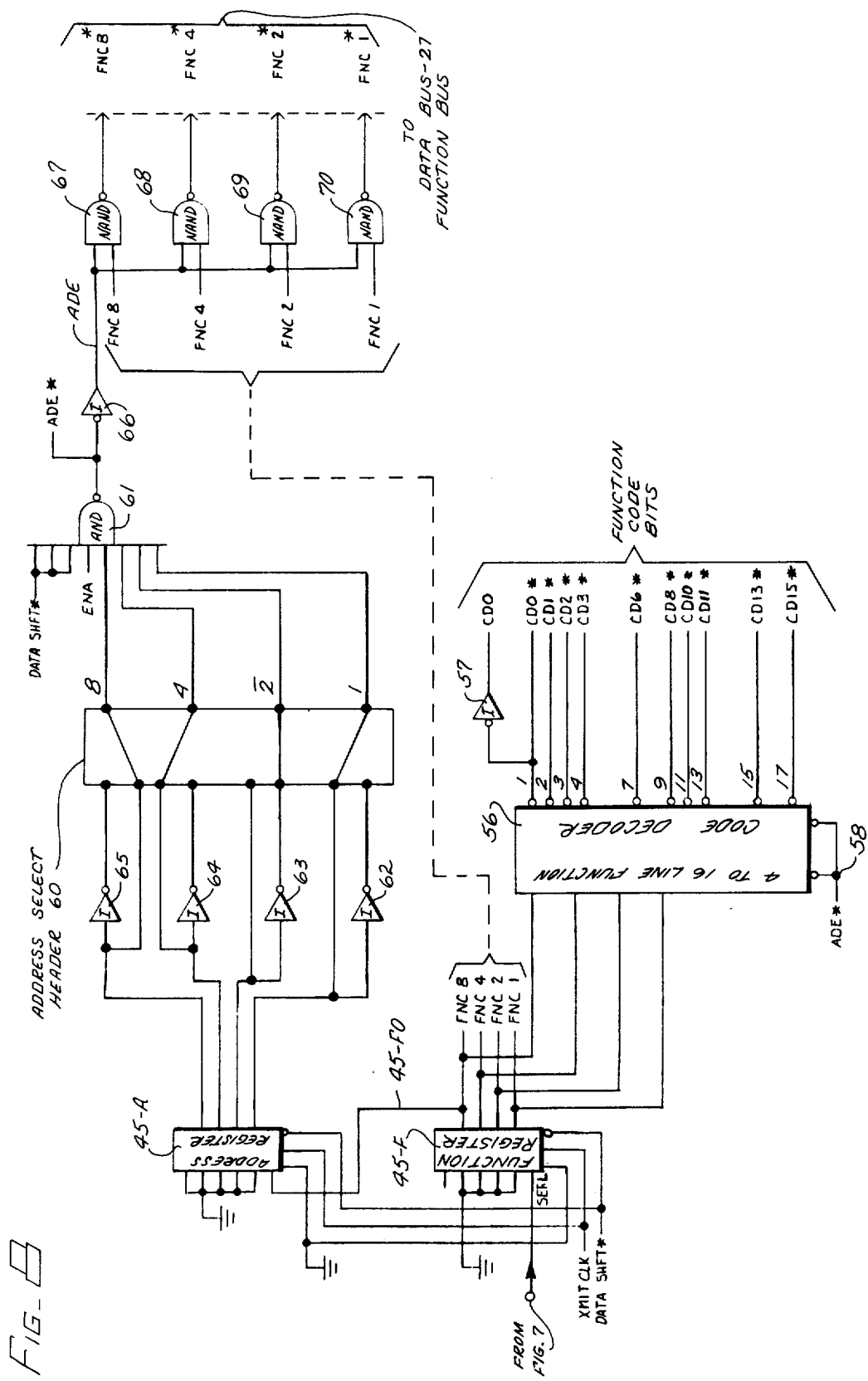
Figure 9:
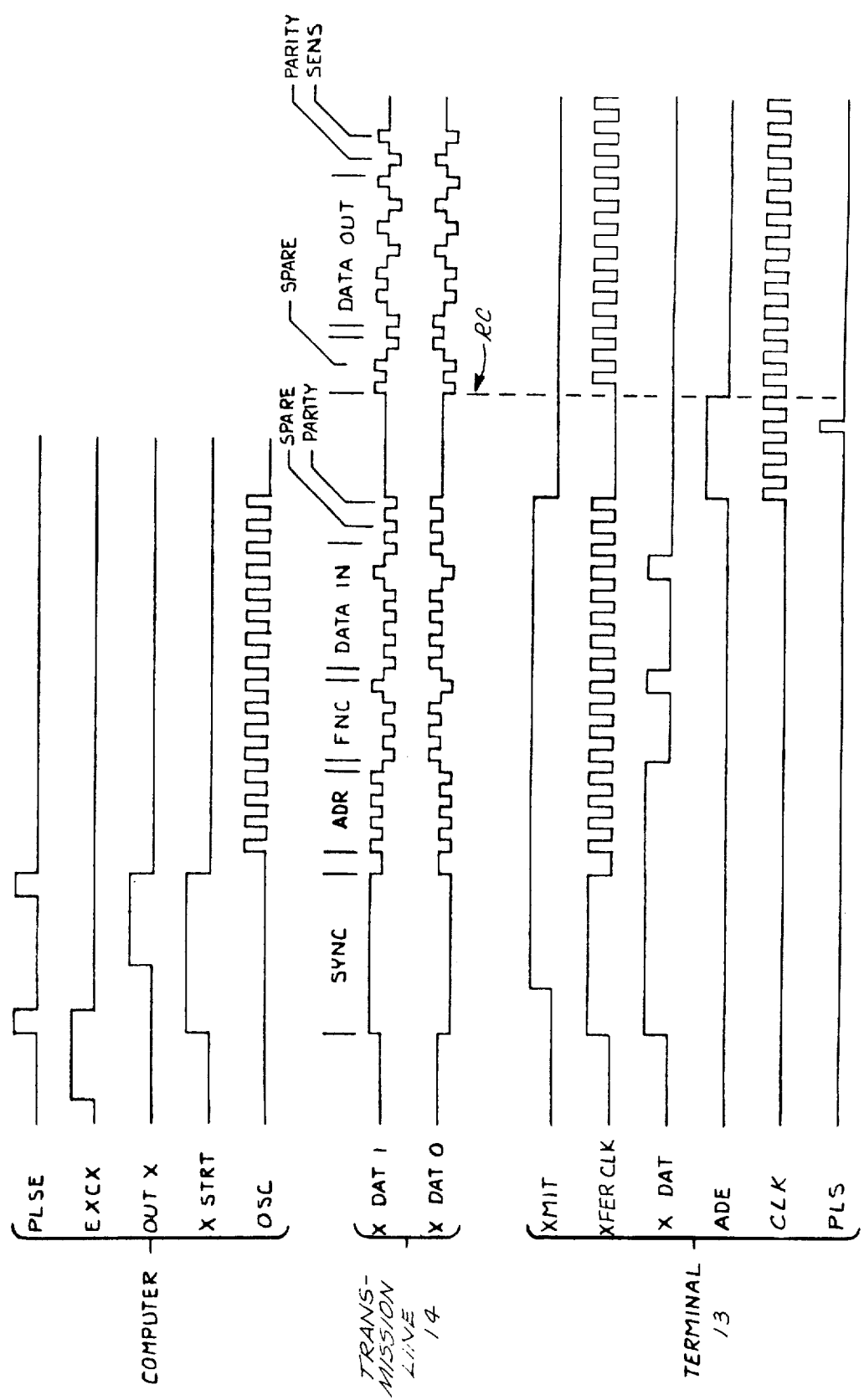
Figure 10:
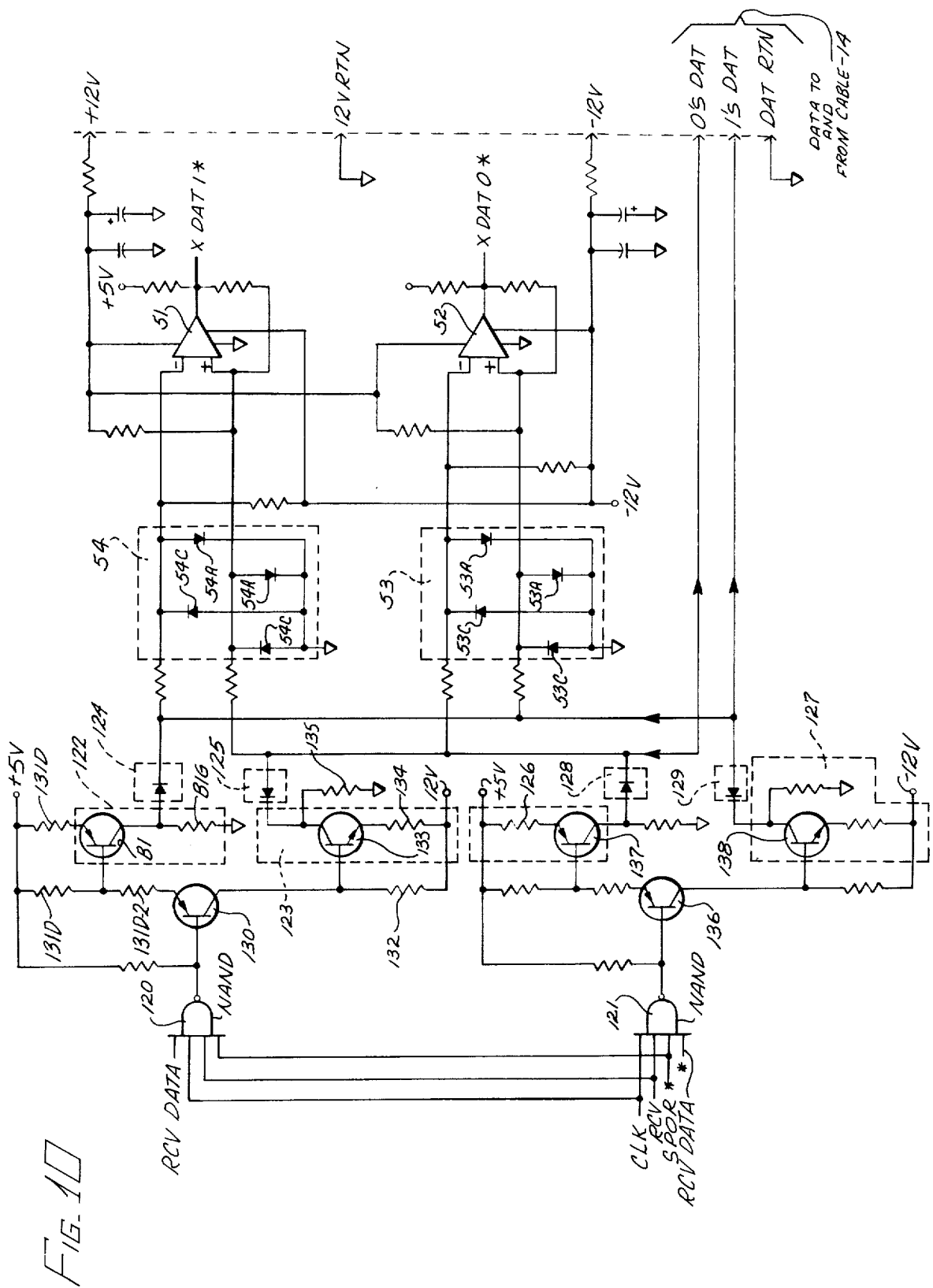
Figure 11:
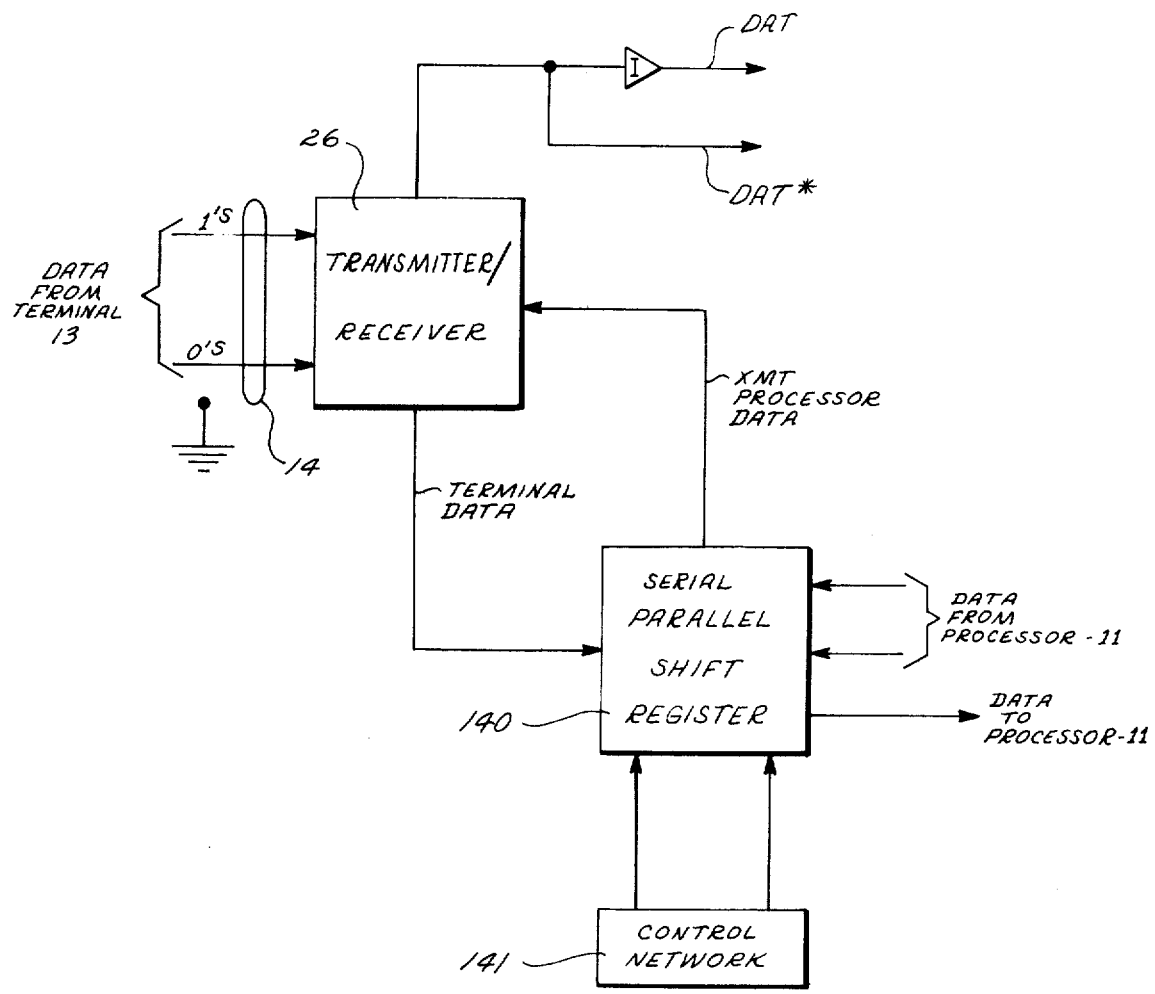
Figure 12:
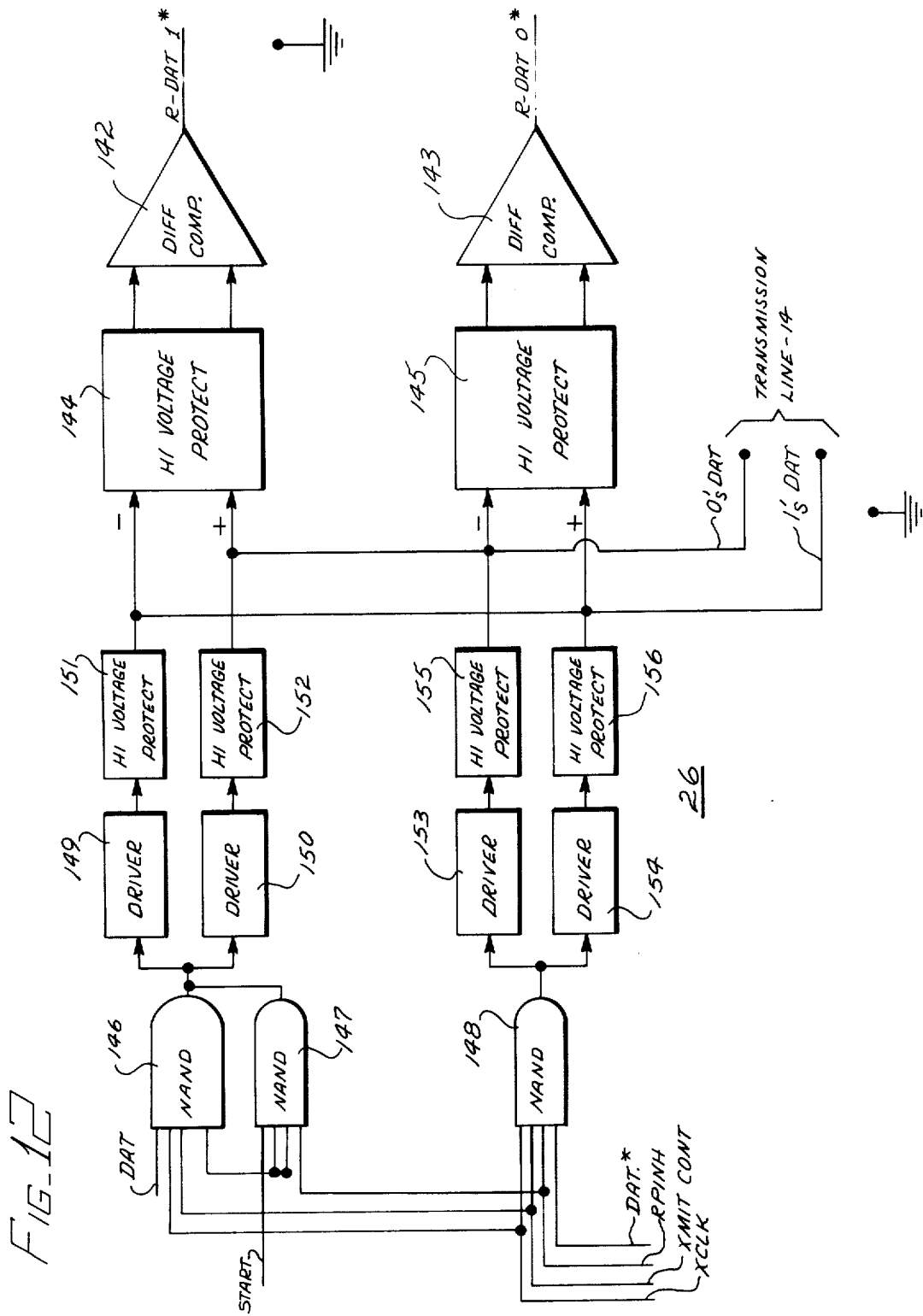

FIGS. 6, 7, and 8, taken together comprise the logic data flow diagram of a terminal transceiver of the system;

FIG. 9 is a graphical illustration of selected typical waveforms appearing in the system;

FIG. 10 is a schematic circuit diagram of the transceiver circuitry illustrated in FIG. 5;

FIG. 11 is a block diagram of the transceiving control network for the retrieval data processor of the system;

FIG. 12 is a block diagram of retrieval data processor transceiver; and

Figure 13:
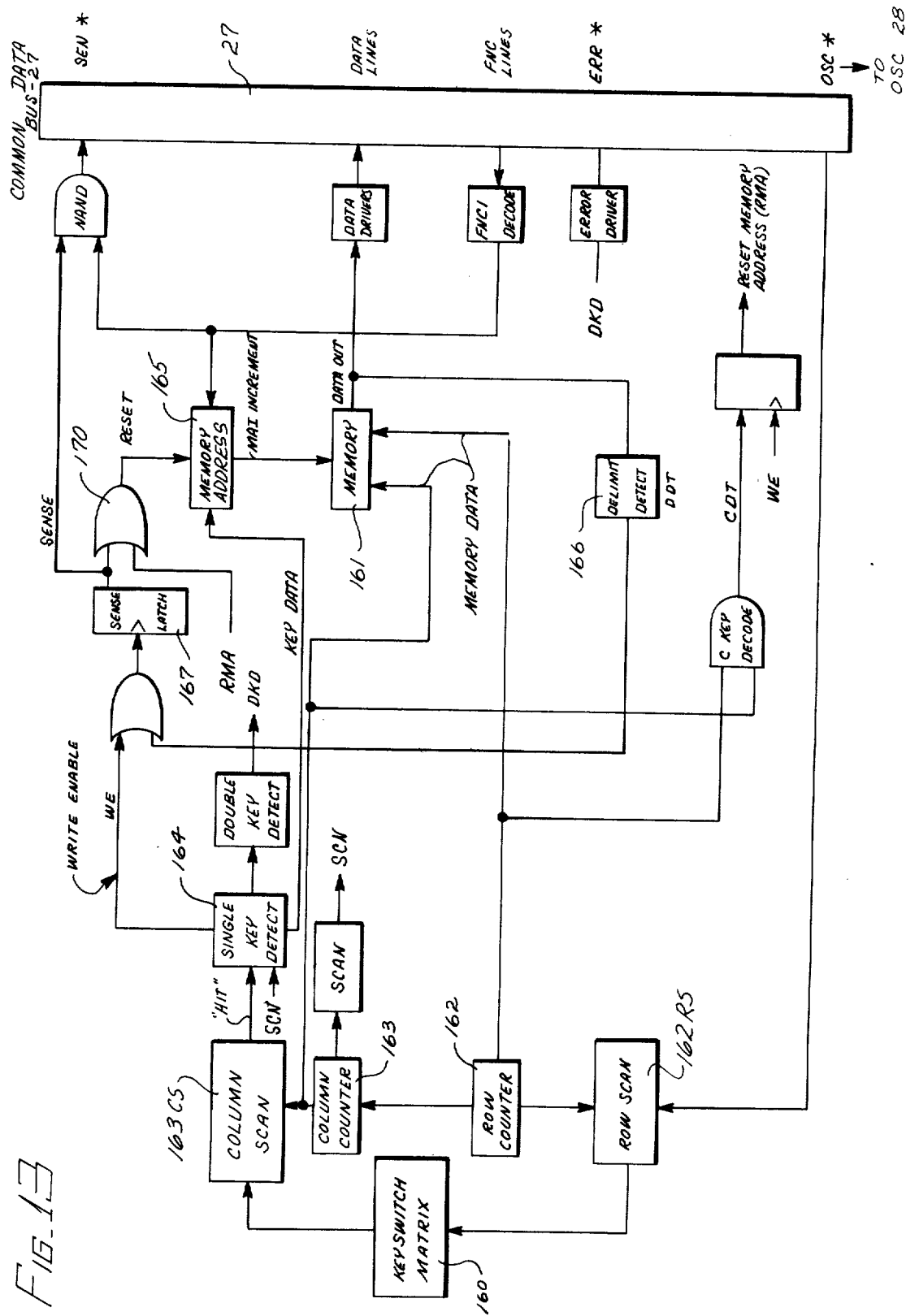

FIG. 13 is a block diagram of the keyboard electronic control circuitry.

Now referring to the drawings, the automatic store transaction system of the present invention will be examined. The general organization of the system is illustrated in FIG. 1. The automatic store transaction system 10 as illustrated in FIG. 1 comprises a retrieval processor 11 having a data storage unit 12 associated therewith, diagrammatically illustrated as a magnetic drum storage unit. The data storage unit may have preselected accessible transaction information recorded thereon such as price information of the various items purchased by the customer. The retrieval processor 11 has the capability of selecting preselected data and operating on the data such as computing the price of the article and updating inventory, etc. The retrieval processor originates a group of data signals for transmitting to the various point of sale terminals 13 arranged in a store and at a location spaced from the retrieval processor 11 at various store item check-out points in the store. Conventionally the point of sale terminal 13 is arranged at the check-out stand such as those utilized in supermarkets. The retrieval processor 11 and the data storage unit 12 may be located in the back room of the store out of the area proper where the goods are to be purchased or displayed for customer selection. This allows access to the data processor 11 for service purposes, changing the stored data and the like. In a practical embodiment the retrieval processor may be a mini-computer.

A serial transmission line 14 is coupled between the retrieval processor 11 and the point of sale terminals 13. The serial transmission line 14 is provided for bidirectionally transmitting binary coded signals between the receiver processor 11 and each of the point of sale terminals 13 as illustrated in FIG. 1. The transmission line 14 comprises a three-wire balanced system wherein the binary coded signals of different values are transmitted on two of the lines with the third line connected to a point of reference potential or ground. Specifically, a positive pulse representative of a binary 1 defines the binary bit that is being transmitted at any one bit time on one of the lines with the complement of the binary bit being transmitted on the other data line. The third or central line has the difference signal appearing thereon. The system is defined as a common ground system with one ground for the whole system. The three wires may be contained in a grounded sheath as illustrated. The serial transmission line 14 is provided with a termination network 15 arranged adjacent the retreival end of the system. A similar termination network 16 is arranged at the opposite end of the transmission line 14 adjacent the last point of sale termial in the line or the terminal n as illustrated in FIG. 1. These terminations 15 and 16 are provided to assure that the transmission line 14 is properly terminated for transmission purposes as is well known in the art. The termination network may comprise a resistive network for this purpose. This transmission line system will allow 250,000 bits per second per 1,000 feet of transmission line to be tranmitted. In this fashion the retrieval processor 11 generates preselected groups of serial trains of data signals for transmitting to the point of sale terminals 13 to determine if there is any data available at the terminal to be processed. For this purpose the retrieval processor 11 will address the various terminals 13 and if a terminal has matching address signal to the address signal transmitted from the processor 11 the terminal will be activated so as to carry out the desired functions for completing the transaction at the check-out stand. This would include the determination as to whether or not data, for example, is present at the terminal to be transmitted back to the processor 11 for retrieving certain information and/or operating on the information at the retrieval processor. In such an event, the processor generated information will be transmitted back to the terminals for completing the transaction and the transaction may be signaled by providing a permanent record as well as a temporary display of the transaction for the customer's convenience.

Figure 2:
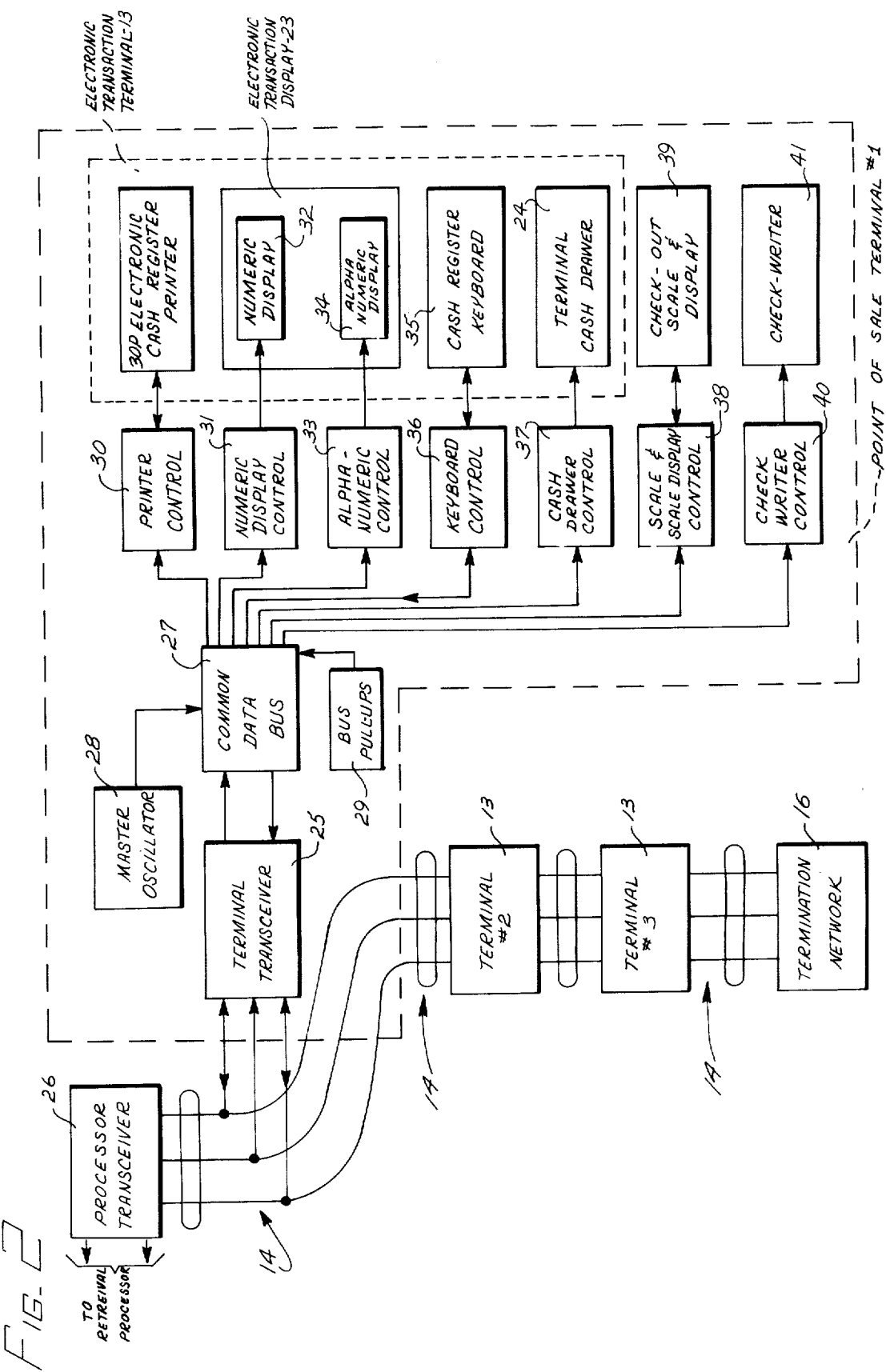
FIG. 2 is a block diagram of a portion of the transaction system illustrated in FIG. 1 and illustrating in block diagram form the various terminal function devices for a point of sale terminal.
Figure 3:
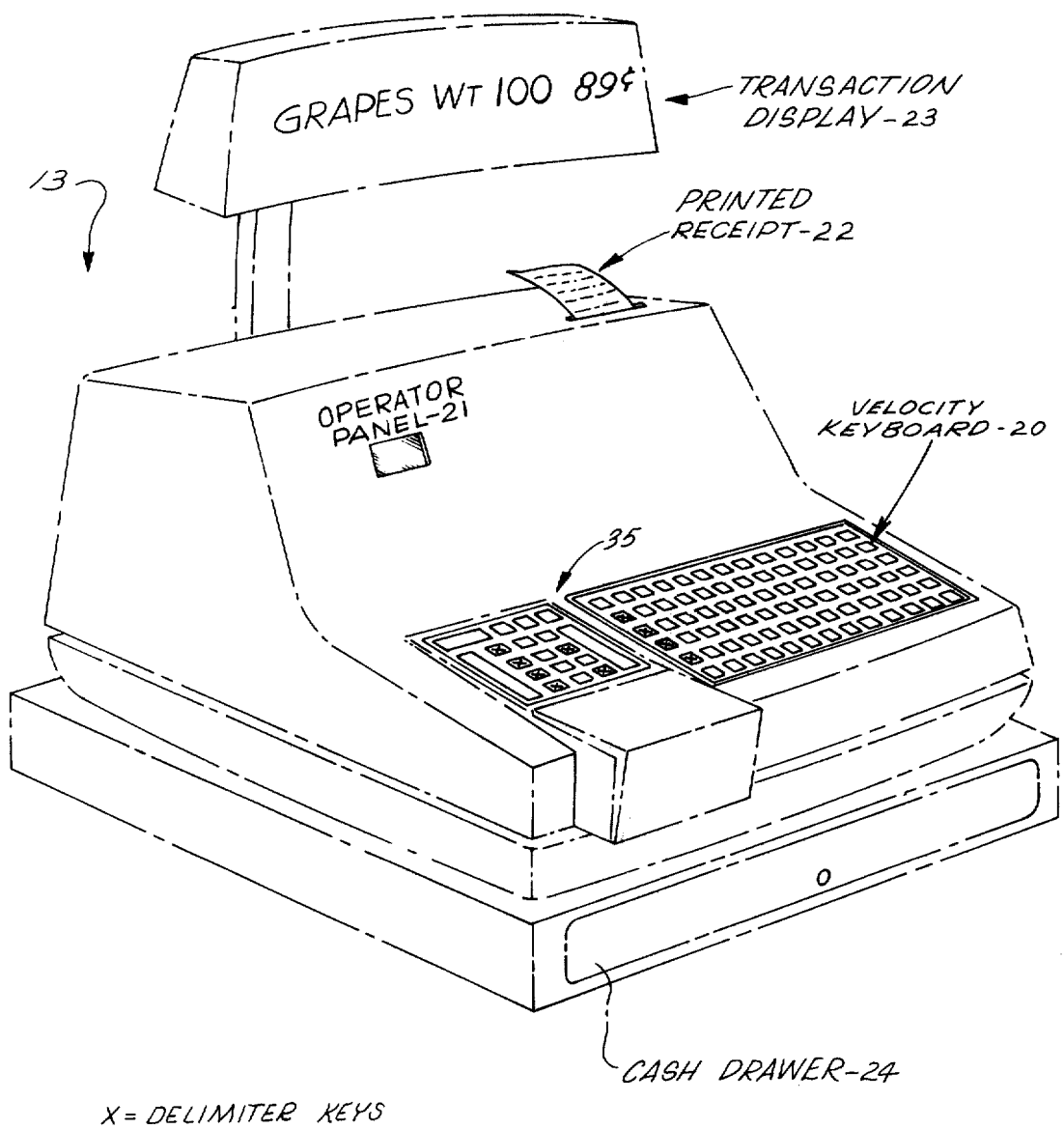
FIG. 3 is a perspective view of an electronic transaction terminal that may be employed in the system of FIG. 1.

The point of sale terminal 13 is shown in block diagram in FIG. 2 and illustrates its relationship with the electronic circuits utilized for each transaction terminal as well as the auxiliary device that may be located at the check-out stand and integrated into the automatic system 10 of the present invention. The mechanical configuration of a transaction terminal 13 as it may be located at the check-out stand is illustrated in FIG. 3. The transaction terminal has a conventional keyboard illustrated to the left of the terminal 13 proper with an auxiliary keyboard identified as a velocity keyboard 20 arranged to the right thereof. The conventional keyboard is utilized for entering information into the system by depressing one of the keys, the depression of a key being effective for generating a binary coded signal representative of the data for which the actuated key is coded to represent. The velocity keyboard 20 is utilized for recording items that are mostly commonly purchased by customers to speed up the check-out transactions. For example, the velocity keyboard 20 may have a key for signalling the purchase of a carton of milk, in which event the key would be coded "milk" to generate a milk signal for transmission to complete the transaction. The operator rather than introducing the information by means of a conventional keyboard, merely depresses the key for indicating the purchase of the carton of milk and this information is transmitted to the computer for selecting the price of that item and to transmit it back to the terminal. The keyboard is further coded in that certain keys on the two keyboards are identified as delimiter keys. These keys as will be appreciated hereinafter are keys that generate a signal for signalling to the electronic system associated with a terminal 13 that all of the valid information for a particular transaction has been entered into the terminal 13 by the operator and the data that has been generated is in condition to be transmitted to the retrieval processor. These keys are illustrated in FIG. 3 by an X on the face of the key. In a practical system, the delimiter keys would be coded as the "Total Credit," "Checking" or "Department" keys. The use of the delimiter key will generate a siganal that is identified as a SENS (sense) signal and will eliminate the time delays introduced by the partial entry of data representative of data or incomplete data that will result, for example, when the check stand operator initiates the entry of a transaction into the terminal 13 and before completing the tranasction stops to discuss the matter with the customer and then continues with the data entries. Once the data entry is completed by means of the depression of a delimieter key the information at the terminal is characterized as valid data and is then in condition to be operated on. This is signalled by the production of the SENS signal.

The terminal 13 also includes an operator panel 21 which signals various conditions of the system to the operator. This may be used for signalling operator keying errors and similar data. Once the transaction is completed a printed record of the particular transaction is provided by the conventional mechanical printer included in the terminal 13. A printed receipt 22 is illustrated in FIG. 3 as it exits from the terminal housing. The printed receipt, in this instance, may not only identify the price of the item but may also identify the item by printing out the description of the item and/or be in terms of an item code. In some instances it has been found to be advantageous to place the code number of the item to be purchased, rather than mark them with a particular price. In this type of system the operator merely enters the code number by the depressing of the appropriated coded key and the price of the item is retrieved from the processor and sent back to the terminal for display and print out. In addition to providing a printed receipt 22, the particular transaction is displayed on the transaction terminal display 23 for the convenience of the customer. For example, the display may include the identification of the item purchased, the quantity and the total price of the transaction. As indicated in FIG. 3, a produce item, a bunch of grapes was purchased by a customer and the weight as well as the total price is displayed on the transaction display 23 so that the customer can watch the transactions and check the operator as they are entered into the terminal 13 by the operator. The terminal 13 also includes a cash drawer 24 which may be controlled by the system. The system of the present invention could be adapted to control the locking and unlocking of the cash drawer 24. Other information such as the time when the particular operator or operators started to work at the terminal and the time when he left the terminal may be entered into the system as a result of the electronic control for such a terminal afforded by the present invention. Along with the electronic transaction terminal 13, there may be integrated a digital scale. The digital scale may be utilized for weighing items from the produce department or similar items sold on the basis of weight. A commercially available scale may be utilized for this purpose and placed adjacent the terminal 13. The commercially available scale will produce the digital output signals representative of the weight of the article so that the digital signals may be transmitted to the processor for calculating the total price of the item and the total price signal may be transmitted back to the terminal 13 and displayed at display 23 for viewing by the customer. In the same fashion, a check writer may be integrated into the check-out stand as an auxiliary item. The check writer can be programmed for writing in the name of the payee or the name of the supermarket and the total amount of the transaction in order to aid in speeding up the check-out operation. The check writer may include means for endorsing it to the store.

From the standpoint of the system 10 the point of sale terminal as illustrated in FIG. 2 will be seen to include a terminal transceiver 25. The terminal transceiver 25 is the electronic element that is coupled to the transmission line 14 for receiving the signals therefrom and coupling signals thereto. Since the transmission line 14 is arranged in a serial circuit relationship with the various terminals 13 each of the terminals will include such a terminal transceiver 25. As illustrated, the transmission line 14 will be coupled in a serial fashion to each of the terminals 13 by means of the transceiver 25 for transmitting the signals from the data processor 11 to each of the terminals. For this purpose the retrieval processor 11 is also provided with a transceiver which is identified as the processor transceiver 26. The processor transceiver 26 is coupled to the output of the retrieval processor circuits for bidirectionally monitoring the signals transmitted from the processor 11 and the signals transmitted from the transaction terminals 13. Each of the transaction terminals 13 are coupled to a common data bus, identified by the reference numeral 27, for the various terminal function devices that are to be controlled by means of the data appearing on the common data bus 27. A master oscillator 28 is coupled to the common bus 27 and is arranged for continuously operating to provide the timing signals or clock pulses generated for controlling the various function devices at a transaction terminal 13. A bus pull-up network, identified by the reference numeral 29, is coupled to the common data bus 27 to complete the data bus structure. The various functions performed at the transaction terminal 13 are outlined hereinabove. The signals transferred to the common data bus 27 by means of the terminal transceiver 25 control the activation of the terminal and the operation of the various devices at the transaction terminal 13 as indicated in block form in FIG. 2. These devices include the mechanical printer 30F for producing the printed receipt 22 and an associated printer control network 30 which receives the signals from the bus 27 when addressed to control the printer proper for printing out the information representative of a transaction. In the same fashion, the transaction display device 23 is controlled in terms of a purely numeric display device 32 and an alphanumeric display device 34. A numeric display control circuit 31, for example, controls the operation of the numeric display 32 which may be that portion of the display 23 that temporarily displays the price for a particular item to be purchased such as the 89 cents indicated in FIG. 3. The alphanumeric display 34 is under the control of an alphanumeric control network 33 which controls the operation of the alphanumeric display 34. With reference to the display of FIG. 3, the alphanumeric data "GRAPES WT 100" identifies that item purchased. In the same fashion, the cash register keyboard 35 is under the control of a keyboard control network 36 for controlling the transfer of the information generated at the keyboard back to the processor 11 by means of the common data bus 27. The keyboard 35 comprehends the two keyboards illustrated in FIG. 3, the more or less conventional keyboard and the velocity keyboard 20. The cash drawer 24 is controlled from the common bus 27 through its individual control network 37. If an auxiliary check-out device such as a digital scale and check writer are employed at the transaction terminal 13, a scale and scale display control network 38 and a check writer control 40 for the writer 41 are provided for controlling the information conveyed by means of the common data bus 27. In this respect, the signals transmitted from the processor transceiver 26 and handled by the terminal transceiver 25 will, when a transceiver 25 is properly addressed, convey the signals to the associated transaction terminal 13, select a particular device to be operated on in accordance with the data transmitted thereto and cause the device to execute its individual function. For example, the information transmitted from the processor 11 that appears on the common data bus 27 may activate the numeric display control 31 so that the price information is displayed at the numeric display 32. Similar functions are controlled through the data signals on the common data bus 27.

A generalized understanding of what occurs within the control portion of the circuits for the electronic transaction terminal 13 can be appreciated from considering FIG. 4. FIG. 4 illustrates in block form and identifies the terminal transceiver 25 as a transmitter/receiver coupled to the serial cable or the transmission line 14. The transceiver 25 is effective to not only receive information from the serial cable 14 transmitted from the processor 11 but is also effective for transmitting data derived from the terminal 13 back onto the cable 14 to the retrieval processor. Considering the information coupled to the transceiver 25 from the cable 14 it will be noted that it is transmitted to a serial-parallel shift register 45 employed for temporarily storing the information coupled from the cable for further processing within the control network. The information transmitted from the processor 11 and stored in the shift register 45 will include address information for identifying the particular transaction terminal 13 to be activated as well as storing function code data bits for addressing the preselected one of the devices within the activated transaction terminal 13 to be rendered operative. Accordingly, with the shift register 45 there is provided an address decode/enabler circuit 46 which is employed for decoding the stored address bits and determining whether or not the terminal has the matching address. If an address match is present the terminal will be activated and an enabling signal from the address-/decode enabling circuit 46 will cause the function code bits stored in the shift register 45 to be transferred to the common data bus 27 for the activated terminal 13. The function code bits will be transferred to the common bus 27 as a result of the provision of an enabling gating signal provided by the element 46 to the bus drivers 47. The stored data bits are coupled to the common bus 27 by the appropriate bus drivers 49. In addition, the enable signal will initiate the decoding of the function data bits. The decoded function code bits signal whether or not data is to be transmitted back to the retrieval process or whether the data received from the processor will be operated on. In the event that the terminal signals that the data generated by the operation of keyboard control is valid, it is transferred to the retrieval processor 11. The data generated from the keyboard, for example, is received from the common bus 27 by a bus receiver 50. The data received by the bus receiver 50 is shifted into the serial parallel shift register 45 for temporary storage and then shifted out by the control network to the transceiver 25 for coupling onto the cable 14 for transmission to the retrieval processor 11 for data handling operations to complete the transaction.

It should be noted that within the terminal transceiver 25 are a pair of differential comparators 51 and 52 coupled to one of the transmission lines 14 to monitor the signals received from the transmission line 14 and transmitted onto the line 14. It is evident from reviewing FIG. 5, that one of the data lines for the transmission line 14 which is identified as the O's DAT, is coupled to the differential comparator 52 through the negative input terminal of a high voltage protect network 53. The 1's DAT line is coupled to the positive input terminal of the high voltage protect 53. The output of the differential comparator 52 is correspondingly identified as a DAT 0*. The 1's DAT transmission line for the cable 14 is also coupled to the negative input terminal of the high voltage network 54 for the comparator 51 with the positive input terminal for the high voltage protection network 54 being coupled to the positive input terminal of the protection network 54. The output of the differential comparator 51 is identified as the DAT 1* output line. These differential comparators 51 and 52 continuously monitor the information received by the transceiver regardless of the source of the data signals, i.e. from the transmission line 14 or the terminal 13 proper.

The data transmitted on the transmission line 14, as monitored by the differential comparators 51 and 52 are applied to the data control network illustrated in FIGS. 6–8. These output signals are applied to a bistable element or flip flop 60. The X DAT 0* signal is applied to the direct reset terminal 60RS for the flip flop 60 while the X DAT 1* signal is coupled to the direct set terminal 60S for the bistable element 60. The output signal from the "set" side of the flip flop 60 is derived from one of the output terminals and is identified as the X DAT signal. The X DAT signal is the signal which is applied to the serial parallel shift register 45 which comprises five bidirectional shift register stages. These shift register stages are identified in FIGS. 7 and 8 by the reference numerals 45-1, 45-2, 45-3, 45-F and 45-A. Accordingly, the data bits derived from the transmission line 14 and monitored by the differential comparators 51 and 52 are serially shifted, initially, into the bidirectional shift register 45-1 and by means of the output lead wire 45-0 the leading binary bit is shifted into the second stage of the shift register 45-2. When the leading binary bit is shifted out of register 45-2 it is entered into the function register 45-F by means of the lead wire coupled to the terminal identified as the SERL terminal of register 45-2 illustrated in FIG. 7 to the corresponding terminal SERL for the function register 45-F illustrated in FIG. 7. In the same fashion, the output lead wire 45-FO for the register 45-F couples the bit shifted out of the function register 45-F into the address register 45-A. In this fashion, all of the data bits received from the processor 11 are stored in these four registers. The transmission from the processor 11 is such that the address bit for addressing a transaction terminal 13 will reside in the address register 45-A and the function bits will reside in the function register 45-F with the bits being stored in the registers 45-1 and 45-2 at the end of the transmission. In each of the registers, it should be noted that the most significant binary bit of the group of bits will reside in the last stage of the shift register. For example, the most significant function bit stored in the function bit register 45-F will be signalled at the ouput terminal 45-FO and is correspondingly identified in FIG. 8 as the FNC8 bit.

Referring specifically to FIG. 8, it will be noted that both the function register 45-F and the address register 45-A each store four binary bits. The function bits stored in the function register 45-F are identified as the bits FNC8, FNC4, FNC2 and FNC1 appearing at the output terminals illustrated in FIG. 8. In the same fashion, four address bits are signalled at each of the four outputs for the address register 45-A.

In addition to the serial input terminal or the identified SERL terminal for the register 45-F an input terminal identified as the transmitting clock XMIT CLK terminal is also coupled to the function shift register 45-F and in parallel circuit relationship it is also coupled as an input to the address register 45-A. These pulses are effective for shifting the received binary bits into the shift registers. The further input to the function register 45-F and the address register 45-A is identified as a data shift input or the DATA SHFT* as identified in FIG. 8. These same two input signals are coupled in parallel circuit relationship to the data shift registers 45-1, 45-2 and 45-3 as illustrated in FIG. 7. In addition, a pulse input terminal identified as the PLS terminal is also applied to these latter three registers as is evident from FIG. 7.

The function code bits identified at the ouput of register 45-F as FNC8, FNC4, etc. are coupled as input signals to a 4 to 16 line function code decoder 56. Such a decoder is well known in the art and the details of such need not be examined at this time. It will be understood that the 4 bits entering into the decoder 56 provide 16 corresponding outputs from the decoder. In this instance only 10 of the 16 outputs are utilized in the control network as the function code bits. The outputs that are utilized are identified as the CD0*, CD1*, CD2*, CD3*, CD6*, CD8*, CD10*, CD11*, CD13* and CD15*. In addition, a 11th code bit is provided and identified as the CD0 bit. This bit is provided as the complement of the CD0* bit as a result of coupling the inverter 57 to the CD0* line. The function code decoder 56 is enabled or activated as a result of the ADE* bit being applied to the input terminal 58 for the decoder 56.

The address bits in the register 45-A are decoded by means of an address select header 60. The address select header 60 is arranged to couple selected output signals from the address register 45-A as input signals to an AND gate 61. The output signals from the address select header 60 are derived from the four output bits from the address register 45-A and their complements. The complements of the bits are generated through the provision of the inverters 62, 63, 64 and 65 coupled to the bit signals from the address register as illustrated. Accordingly, four input lead wires from the header 60 are coupled as input leads to the AND gate 61 representative of the address of the particular transaction terminal 13. A representative group of 4 binary bits are illustrated in FIG. 8 and can be considered as the 8, 4, 2, 1 bits or the decimal number 13. Also, as an input signal the AND gate 61 receives an "enabling signal" identified as the ENA signal. In conjunction therewith is a data shift signal which is identified in FIG. 8 as the DATA SHFT* signal. At the time interval, then, that the address select header signals are TRUE, the ENA signal is TRUE and the DATA SHFT* signal is TRUE (no data is being shifted), a TRUE signal appears at the output of the AND gate 61. This signal is identified as the ADE* signal which is coupled to the corresponding line or input terminal 58 for the function code decoder 56. The complement of the ADE* signal is provided through an inverter 66 coupled to the output of AND gate 61. The output of the inverter 66 provides the ADE signal which is coupled in parallel circuit relationship to the four NAND gates identified by the reference numerals 67, 68, 69 and 70. The two input NAND gates 67-70 also receive individual ones of the function bit signals FNC8, FNC4, FNC2, FNC1 as a second input signal to the two input NAND gates 67-70 respectively. The output signals of these NAND gates are identified as the corresponding function bits or FNC8*, FNC4*, etc. as clearly illustrated in FIG. 8. These output signals are coupled to the function bus for the common bus 27 of the terminal upon the provision of the ADE signal.

With reference to FIG. 7, it will be recalled that the data bits from tranmission line 14 are stored in the registers 45-1 and 45-2. The output binary bit signals from these registers correspond to the six transmitted data bits and are coupled as input signals to the series of two input NAND gates identified by the reference numerals 71, 72, 73, 74, 75 and 76 reading from the top to the bottom in FIG. 7. Each of these input signals are coupled with the output signal from the OR gate 77 which functions as the other input signal to each of the aforementioned NAND gates 71-76. The OR gate 77 is an eight input or gate and receives the decoded function code bits from the output of the decoder 56. The function code bits thus are applied to the input of the OR gates 77 are those function code bits which control transfer of information received from data processor 11 to the terminal 13. These bits are identified as the CD2*, CD3*, CD6*, CD8*, CD9*, CD10*, CD11* and CD13* bits. Accordingly, when any one of the decoded input signals are present at the input of th OR gate 77, an output signal will be generated and cc pled to the corresponding inputs for the NAND gates 71-76 to provide the output signal from the corresponding NAND gate which has its logical input conditions satisfied in accordance with "NAND" logic. It will of course be recognized that an output signal will only be generated from a NAND gate when only one input is TRUE and not both are TRUE. The data signals stored in the shift registers 45-1, 45-2 will then be transferred to the data bus of the common bus 27 for the terminal 13 by means of the output lines from the NAND circuits as is evident from FIG. 7. In the same fashion, when data is generated at a particular terminal 13 by means of a keyboard or the like for transmission to the data processor 11, the signals appearing on the data bus for the common bus 27 of the terminal 13 are shifted into the register 45-1, 45-2 and 45-3. The signals appearing on the data bus of the terminal 13 are identified in FIG. 7 as the data signals 0–6 and include the data P* signal, the sense signal which is identified as the SEN* signal. These signals are coupled from the data bus of the common bus 27 as input signals to the inverters 78, 79, 80, 81, 82, 83, 84, 85 and 86, reading from the top to the bottom of FIG. 7. Accordingly, these data bits are transferred in parallel circuit relationship into individual registers of the three bidirectional shift registers 45-1, 45-2 and 45-3 to which the corresponding output signals from the inverters 78-86 are coupled. This places the data bits generated at the terminal 13 in a position to be transmitted to the retrieval data processor 11. The transfer of the information on the terminal data bus of the common bus 27 is effectd by means of the PLS pulse coupled in parallel circuit relationship as an input signal to each of these three shift registers. For the purpose of transmission to the computer, the signals will be serially shifted out of the shift registers to the output terminal of the shift register 45-3 which is identified as the RCV DATA output. The complement of this signal is also generated through the provision of an inverter 87 coupled thereto for providing the RCV DATA* signal from the output of the inverter 87.

At this point it would be convenient to examine a typical series of signals that would be transmitted down the transmission line 14 to a transmission terminal 13. Such a grouping of signals is illustrated in FIG. 9. It will be recognized that in the three-wire transmission system embployed in the present invention that a data bit and its complement is transmitted in terms of two transmission lines. Accordingly, only the transmitted 1 data bit need be examined. A typical group for a serial train of bits and a synchronizing pulse, SYNC, pulse, to be transmitted to a terminal 13 is illustrated in FIG. 9 in the grouping of the "LINE 14" bits opposite the X DAT 1 line. The SYNC pulse will have a preselected time duration for clearing the transaction terminals 13 in preparation for the data handling operations or the successive binary bits. The first four bits are identified as the address bits as the ADR bits. These are shown in FIG. 9 as four 1's. The address bits are followed by four function bits or the four bits 0001 identified as the FNC bits in FIG. 9. Six data bits are then illustrated adjacent the function bits as the bits transmitted from the processor 11 as the 000010 bits. A spare bit and parity bit are also illustrated as a pair of binary 0's. From this arrangement of transmitted signals it should be evident that the address bits will reside in the address register 45-A as the leading group of bits, the function bits in the register 45-F and the "data in" bits in the registers 45-1 and 45-2. The bits illustrated to the left of the dotted line identified in FIG. 9 as the RC line are the typical bits that may be developed at the transaction terminal 13 to be transmitted back to the data processor 11. Twelve such bits are illustrated and identified as the spare bits and the "data out" bits along with a parity and sens (sense) bits.

It will be recalled that the received data bits are coupled from the transmission line 14 to the differential comparators 51 and 52 and from these elements to the flip flop 60 illustrated in FIG. 6. The X DAT 0* bit is coupled to the flip flop 60 in parallel circuit relationship to an OR gate 90. The X DAT 1* signal, in addition to being coupled to the flip flop 60 is coupled as an input signal to an OR gate 91. This same signal is coupled as the second input signal to the OR gates 90. It will thus be seen that both the X DAT 0* signal and the X DAT 1* signals are applied to the OR gate 90 and since they are complements, a series of pulses will be generated from the OR gates 90 corresponding to the sixteen bits transmitted along the transmission line 14. These sixteen bits are applied and counted by the 16 bit counter 92 having an input coupled to the output of the OR gate 90. The output signal from the OR gate 91 is coupled to a time delay network 93 which comprises the RC network of the resistive impedance 93R and the capacitor 93C. The common junction between these two elements 93J is coupled in common to the output of the OR gate 91. The remaining terminal of the resistor 93R is connected to a source of positive potential such as +5 volts. The remaining terminal of the capacitor 93C is connected to ground potential. The common junction 93J for the time delay elements is coupled as an input signal to a Schmitt trigger 94. The Schmitt trigger output signal is coupled to the set input of a flip flop 95 and also as an input to the inverter 96. The inverter 96 has its output connected as an input to the "16" counter 92. The output signal from the inverter 96 is also applied to the OR gate 97 for providing the output signal KAL* at its output. The 16-bit counter 92 has four outputs, three of which are identified in FIG. 6 as the 8-2-1 outputs reading from the top to the bottom or from the most significant bit to the least significant bit. THe "4" bit signal is not identified. The signal appearing at the ouput of the Schmitt trigger 94 is identified as the transmit enable signal, or the XENA* signal. The flip flop 95 is also coupled to receive the transmission signal identified as the XMIT signal in FIG. 9 and the "8" bit output signal from the bit counter 92. The SPOR* signal is also coupled to the flip flop 95. One of the output signals from the flip flop 95 is identified as the XMIT signal, while the second output is identified as the receive control signal or as identified in FIG. 6 as the RCV CONT signal. The RCV CONT output signal from the flop flop 95 is coupled directly to the reset terminal for a sequencing control shift register 98. The reset terminal for this register is identified by the reference numeral 98R. The shift register 98 is employed for sequence control during transmission enable XENA* signalled at the output of the Schmitt trigger 94. A clock or timing signal is also applied to the register 98 and is identified as the CLK* signal. The output signals from the register 98 are identified as the ENA signal or the enable signal derived from the first state of the shift register reading from the bottom to the top as illustrated in FIG. 6. The next three signals are identified by the numerals 14, 13, 11 and 10. The last output signal is further identified as the receive, RCV, signal and is coupled as one input of a NOR gate 99. The other input of the NOR gate 99 is the XMIT signal. The output of the NOR gate 99 is identified as the data shift signal or DATA SHFT*. It will be recalled that the ENA signal is coupled to the AND gate 61 (See FIG. 8) to enable the gate in the event of an address match between the address signals transmitted from the processor 11 and the address signals signalled by the address select header 60. The NAND gate 100 has an input signal, the signal appearing on the terminal 13 for the control shift register 98. The other input signal for the NAND gate 100 is the signal coupled directly from the flip flop 95 or the RCV CONT signal. The output of the NAND gate 100 is coupled as an input signal to the NOR gate 101. The other input signal for the NOR gate 101 is derived from terminal "11" of the register 98. The output signal from the NOR gate 101 is coupled as an input signal to a NAND gate 102 in conjunction with a clock, CLK, pulse. The NAND gate 102 may be a NAND driver circuit and provides as an output signal the "pulse" signal PLS*. The complement of this signal is generated through the provision of the inverter 103 for providing the output signal identified as the PLS signal. It will be recalled that this PLS signal is coupled to the shift register 45-1, 45-2 and 45-3 as a strobe signal for transferring the terminal generated data bits into the shift registers; see FIG. 7.

The 8-2-1 bit signals provided at the output of the bit counter 92 are coupled as the three input signals to the AND circuit 104. The output signal of the AND circuit 104 is coupled through an inverter 105 to the reset terminal of a flip flop 106. The set terminal of the flip flop 106 is responsive to the output signal from an OR circuit 107. The OR circuit 107 receives as input signals the various decoded function code bit signals from the decoder 56 (FIG. 8) which control the transmission of the data from the terminal 13 back to the processor 11. These input code bits are identified as the CD10*, CD9*, CD8*, CD15* CD1 and CD0* bits. The bits are coupled as inputs to the OR gate 107. A clock, CLK, input terminal is also identified as an input to the flip flop 106. The one identified output terminal of flip flop 106 identified as "10" is coupled directly as an input signal for the OR gate 108. This signal is coupled in conjunction with the RCV signal derived from the last stage of the shift register 98. The output signal from the OR gate 108 is coupled as an input signal to the NAND gate 109. The NAND gate 109 is a three input NAND gate and includes as an input signal the RCV CONT signal derived from the output of the flip flop 95. The remaining input to the NAND gate 109 is the oscillator signal derived from the master oscillator 28 for the common data bus 27 for the terminal 13. Accordingly, a clock output signal is derived from the NAND gate 109 when its input conditions are satisfied and this output signal is identified as the CLK* clock signal. The complement of this signal is provided from the inverter 110 coupled directly to the output of the NAND gate 109. This latter output signal is identified as the CLK signal.

The X DAT 1* signal is also applied to a parity error detect flip flop 111 through an OR gate 112. The input to the OR gate 112 is coupled directly to the X DAT 1* input line with all its inputs connected in common, as illustrated in FIG. 6. The output signal of the gate 112 is connected to the flip flop 111. A further input coupled to the reset terminal for the flip flop 111 is identified as the XENA* input. The output signal from the flip flop 111 is coupled in parallel circuit relationship to the OR gate 112 as one input and as an input signal to the OR gate 113. The remaining input to the OR gate 112 is the decoded function bit signal CD0. The output of the OR gate 112 is coupled to a parity error save flip flop 114 which is also responsive to the pulse, PLS, signal, along with the CD0 signal and the SPOR* and PLP signals. The output from the flip flop 114 is coupled as the other input to the OR circuit 113. The output of the OR circuit 113 is coupled as an input to the NAND circuit 115 in conjunction with the CD0 signal. The output of the NAND circuit 115 is identified as a sense output signal or a specifically identified in FIG. 6, as the SENS* signal.

Now referring back to FIG. 5, it will be recalled that the receiving portion of the transceiver monitors the data bits from the transmission line 14 by means of the pair of differential comparators 51 and 52. The singals are generated at the terminal 13 and shifted out of the shift register 45-3 and appearing on the RCV data and RCV data* output lines from the shift register are also monitored by these comparators 51 and 52. The register 45-3 outputs are coupled individually to a pair of NAND gates 120 and 121. The RCV data signals or the signals representative of the 1 binary bits are coupled to the NAND circuit 120 while the employment thereof is coupled to the NAND circuit 121. The remaining inputs for the NAND gates 120 and 121 are coupled in parallel circuit relationship to each of the remaining inputs for these gates. These input signals are identified as the clock, CLK, signal and the RCV signal and the SPOR* signal. The SPOR* signal is derived from the common bus 27 and is merely used to momentarily deactivate a terminal 13 when power is applied or removed and may be generally ignored for the purposes of the present invention. The output of the NAND gates 120 and 121 are each coupled to an individual pair of driving circuits arranged in parallel circuit relationship. The output of the NAND circuit 120 is coupled to the pair of drivers 122 and 123 which in turn are each coupled to an individual pair of high voltage protection networks 124 & 125 arranged with the negative input for the network 54 for the differential comparator 51. Similarly, a protection circuit 125 is connected to the positive terminal of the protection network 54. The output signals from these protection circuits 124 nd 125 are also coupled to the transmission line 14 for transmitting the terminal data back to the data processor 11. In the same fashion, the drivers 126 and 127 are coupled to the output of the NAND circuit 121 with a pair of high voltage protection networks 128 and 129 respectively coupled to their outputs. The output of the network 128 is coupled to the negative terminal of the high voltage protection network 53 for the differential comparator 52. The protection circuit 129 is coupled to the positive terminal of the protection circuit 53. These output signals are also coupled to the transmission lines 14 in parallel circuit relationship with the input to the comparators 51 and 52. It will be recognized that the polarity of the data bits selects the driver pairs. For transmitting a 1, the driver pair 122 and 123 are energized and when the DAT 0* line is to tranmmit a binary 1, the driver pair 126 and 127 is energized.

For a better appreciation of the circuit organization illustrated in FIG. 5, reference may be had to FIG. 10 wherein the detailed schematic circuit diagram represented by the block diagram of FIG. 5 is illustrated. From this it will be noted that the data bits from the transmission line 14 are applied to the differential comparators 51 and 52 through the high voltage protection networks 53 and 54. It will be noted that the 0's binary bit is applied through the protection network 53 to the negative input terminal of the comparator 52 and in parallel circuit relationship through the network 54 to the positive input terminal of the comparator 51. In this same fashion, the 1's data bits are applied to the positive terminal of the comparator 52 and the negative terminal of the comparator 51. In reviewing FIG. 10 it will be noted that the high voltage protection networks 53 and 54 comprise an arrangement of diodes such as the pair of diodes 53C each having their cathode electrodes connected to one of the input terminals and the remaining electrodes connected to ground. In the same fashion, a pair of diodes 53A have their anode electrodes connected to the pair of input lines and the remaining electrodes connected to ground. A similar arrangement of diodes is provided for the high voltage protection network 54 for the comparator 51. The diodes for this network are similarly identified as the diodes 54C and 54A. The pair of diodes having the same reference letter being poled as described for the network 53. The function of the protection networks 53 and 54 is to protect the receiver network from high voltage pulses such as environmental noise pulses and manual errors that are introduced. In retail outlets such as supermarkets noises from refrigerator equipment and similar equipment commonly found in a supermarket produce such environmental noises and are an important factor to be considered. Without such a protection system it has been found that the comparators may be rendered inoperative as a result of not being isolated from such destructive noise signals.

The comparators 51 and 52 also monitor the data to be transmitted onto the tramsmission line 14. For this purpose, the information is introduced through the NAND element 120 and 121. The output of the NAND circuit 120 is coupled to the base electrode of a switching transistor 130. The emitter electrode of the transistor 130 is connected to a voltage dividing network comprising resistors 130D and 130D-2 and connected to a source of positive potential, such as +5 volts. The base electrode of a transistor driver 131 is connected to a common point in the voltage dividing network between the resistors 130-D and 130D-2. The emitter electrode for the transistor 131 is connected to the source of positive potential through a dropping resistor 131D while the collector electrode is connected to ground through a resistive impedance 131G, as illustrated. The collector of the transistor 131 is coupled to a protection diode 124 coupled in series to switch the signals onto the 1's data line of the transmission line 14. The protection diode 124 is poled with its anode electrode connected to the collector electrode of the transistor 131. The diode 124 functions to block the high positive voltage potentials from the transistor 131 while the transistor blocks the negative voltages. The collector electrode of the switching transistor 130 is coupled to a source of negative potential through a dropping resistor 132. The base electrode for the driving transistor 133 is directly connected to the collector electrode of the transistor 130. The emitter electrode of the transistor 133 is connected by means of a resistive element 134 to a positive voltage source, on the order of −12 volts. The collector electrode for the transistor 133 is coupled to the cathode electrode of the protection diode 125 functioning as a high voltage protection circuit. The collector electrode is also connected through a resistive element 135 to ground. THe anode electrode for the diode 125 is coupled to the 0's data line for propagating a signal. The series diode 125 functions as the diode 124 except that it is oppositely poled to block the opposite polarity voltages or the negative voltages. In the same fashion, the transistor is effective for blocking the positive voltages. The resistive element 131G is proportioned to handle the leakage currents from the protection diode 124. The same arrangement of a switching transistor and a pair of drivers is arranged with the NAND circuit 121 for coupling to the transmission line 14. The switching transistor is identified by the reference numeral 136 and the transistor drivers as 137 and 138. These driver transistors are coupled through protection diodes 128 and 129 to the 0's and the 1's data lines of the transmission line 14, respectively and correspond to the protection diodes 124 and 125. A characteristic of the differential comparators 51 and 52 that should be noted is that they are energized when the input signal reaches a predetemimed positive level and remain energized until a predetermined positive level is reached. The turn-off voltage level is of a lower level than the positive voltage required to turn the comparator on.

At this point it should be noted that the comparators 51 and 52 monitor the data signals appearing on the transmission line irrespective of the source of the signals i.e. whether they are transmitted from the data processor 11 or originate at the terminal 13 they are applied as the X DAT 1* and the X DAT 0* signals to the control network. When the signals originate with the terminal 13, the control network is effective for transmitting it to the computer and vice versa.

It will be recalled that the information transmitted from a selected terminal 13 to the data processor 11 is received and transmitted by means of the processor transceiver 26. The processor transceiver 26 receives the data from the transmission line 14 and applies it to a control network similar to that employed for the terminal transceiver. This block diagram arrangement is illustrated in FIG. 11. The information from the transceiver 26 derived from the transmission line 14 is applied to a serial parallel shift register 140. The shift register 140 is arranged with a control network 141 in the same general fashion as the network employed for ther terminal transceiver 25 and which is identified in FIG. 11 by the reference numeral 141. Suffice is to say that for the present purposes that the control network 141 is operative to provide the necessary control signals for shifting the information out of the serial parallel shift register 140 in parallel fashion to the data processor 11 to be operated on by the processor. The data retrieved from the processor 11 will be transferred in parallel circuit relationship to the shift register 140. The control network 141 will apply the data from the processor 11 by means of the transceiver 26 to the transmission line 14. These output signals are identified as the DAT and DAT* signals in FIG. 11. A typical series of waveforms operative for generating the necessary control and data transfer operations are illustrated in FIG. 9 opposite the groupings of signals identified as "Computer." These signals include a pulse, PLSE, signal which controls the time duration of the SYNC pulse signal on the line 14. The transmission start, XSTRT, signal initiates the transmission of pulses onto the line 14 along with the clock pulses identified as the oscillator, OSC, pulses. As execute transmission, EXCX, and a transmission out, OUT X, are also generated.

The generalized block diagram of the processor transceiver 26 is illustrated in FIG. 12. The transceiver 26 is shown as being coupled to the transmission line 14 wherein the 1's and 0's data signals are applied to a pair of differential comparators 142 and 143 through high voltage potential networks 144 and 145. The comparator 142 provides the retriever output signal identified as the R-DAT 1* while the comparator 143 provides the output signal R-DAT 0*. As in the terminal transceiver, the data derived from the processor 11 is transmitted to the transmission line 14 under the control of a plurality of NAND circuits. The three NAND circuits are illustrated and identified by the reference numerals 146, 147 and 148. The NAND circuits 146–148 generally function in the same fashion as the NAND circuits 120 and 121 discussed in connection with FIGS. 5 and 10. The NAND circuits 146 and 147 have their outputs connected in common. The NAND circuit 147 has a start input terminal which is effective for starting the transmission of the signals from the computer. This is initiated by generating the SYNC pulse discussed hereinabove. The pair of NAND circuits 146 and 147 are coupled together and a pair of drivers 149 and 150. The driver 149 and 150 are coupled to a high voltage protection circuit of the same type as discussed in connection with FIGS. 5 and 10 and are identified by the reference numerals 151 and 152. The output of the circuit 151 is coupled to the 1's line of the transmission line 14 while the output of circuit 152 is coupled to the 0's line for transmitting the processor data onto the line 14 and thereby onto a selected terminal 13. The output circuit for the NAND circuit 148 is arranged with a pair of drivers 153 and 154 and arranged with high voltage protection circuits 155 and 156. The protection circuit 155 is connected in common with a negative input to the high volage protection circuit 145 and the 0's line of the transmission line 14. The protection circuit 156 is connected in common with the positive terminal of the high voltage protection circuit 145 and the 1's data line. It should now be evident that the manipulation of the data between the transmission line 14 and the processor 11 is generally the same as discussed in detail for the terminal transceiver 25. The information transferred from a terminal 13 is monitored by the differential comparators 142 and 143 and transferred to be operated on by the retrieved processor 11. Similarly, the data from the processor identified as the DAT and DAT* bits is processed through the NAND gates 146–148 and coupled to the transmission line 14.

Now referring to FIG. 13 the control network for the keyboard of the transaction terminal 13 will be described. The keyboard control circuit is designed to operate on the common bidirectional data bus 27. From a practical standpoint the connections to bus is series 7400 TTL compatible. Each bus input/output may represent a standard 7400 series TTL load only. The connections to the common bus 27 are identified as follows:

Data 0*
    Data 1*
    Data 2*
    Data 3*
    Data 4*
    Data 5*
    Data 6*
    Data P*
    FNC 1*
    FNC 2*
    FNC 4*
    FNC 8*
    PLS*
    POR*
    ERR*
    +5V
    GND
    −12V
    OSC*

Each bus line having a pin connection representative of the above.

The keyboard control circuit for a key switch matrix input may be comprised of either solid state or reed switches. The key switch matrix is identified by the reference numeral 160. The matrix is arranged by the reference numeral 160. The matrix is arranged electrically in rows and columns in the form of the ASCII standard code. A similar key switch matrix is described in copending application bearing Ser. No. 135,345 identified hereinabove, and now U.S. Pat. No. 3,771,132. The key switch assembly as illustrated in FIG. 3 has two kinds of keys that are identified as data keys and delimiter keys. The data keys represent data to be entered into the system and load the data signal into a memory but do not set the bus sense line SEN*. The delimiter key is used to load a delimiter character and to set the sense line signal to signal the computer that a set of valid data is ready to be retrieved and transmitted to the processor 11. The data processor 11 will respond with a signal identified as the FNC 1* signal which is used to gate the keyboard data onto the common data bus 27.

In the transfer of the information in response to the computer signal FNC 1*, which is a TRUE signal or a low voltage level, will enable the keyboard control 36 to set the SEN* line TRUE or low when a delimiter key is depressed. The first character entry will then appear on the DATA* line in ASCII code. Accordingly, each time that a pulse, PLS*, is generated the data will shift to the next less significant entry until the delimiter is received after which the last PLS* resets the SEN* bus line and ends the data interrogation sequence.

Referring particularly to FIG. 3 it will be seen that a bus oscillator signal OSC* from the bus master oscillator 28 drives the row counter 162 and the column counter 163 which are used to scan the key switch matrix 160. The counters 162 and 163 function through a row scan circuit 162 RS and a column scan circuit 163 CS respectively. The matrix 160 is a 16 row 8 column representation of the ASCII or American standard for information interchange code. If a key is depressed it will be detected as a "hit" because the row in which it resides was pulled low when scanned and the column scan circuitry 163 CS looks for low logic levels to record a hit. The scanning circuitry is arranged so that the matrix is scanned every other time. Therefore a key is allowed one scan period to bounce before a decision is made to set the sense line or not. The hit signal is analyzed by the single key detect circuitry 164 which generates a "write enable," WE, signal. The write enable signal loads the key data into the memory address register 165. The key detect circuitry 164 detect increments the memory address with memory address increment, MAI, at the beginning of the next scan period after the key is released. A delimiter first DDT, circuit 166 detects the presence of a code which is in a particular column, such as the column zero of the ASCII code. This delimiter code may be given to the keys identified by an X in FIG. 3 as the ENTER, TOTAL, CREDIT, CHECKING and DEPARTMENTS keys. If this code is present when the data is loaded into the memory 161 a sense latch 167 is set in response to the signal appearing on line 166 DDT from the delimit detect 166. Concurrently, the memory address 165 is reset by the sense gate 170 so that the first character loaded will be the first to be taken. "Sense" gates FNC1* into the memory address increment circuit. When the delimiter detect circuit 166 goes TRUE as the delimiter character is transferred out of the memory, the sense latch 167 and the memory address 165 are reset and the entire process ends. If an entry on the keyboard must be cleared the clear key data is decoded and used to generate a reset signal CDT which is applied to an OR gate with the MAR signal. The error signals such as the double key detect, DKD, appear on the bus as the ERR* signal and are displayed at the panel 21 for the terminal.

With the above structure in mind the operation of the automatic store transaction system will be examined in detail. Initially it is an aid in understanding the detailed operation of the system if it is viewed from a general standpoint without reference to the above structure. It will be recognized that the retrieval processor 11 interrogates each transaction terminal 13 sequentially to determine if there is any data available for transmitting it to the processor. It will be recognized that the data is available as a result of the operation of the keyboard for a particular transaction terminal and valid data ready to be transferred is signalled in response to a delimiter key operation. Also, the event that a check writer or digital scale is incorporated into the system. Similar controls may be utilized to transfer data, the keyboard control network being typical of such networks. In the case of the keyboard the sense line for the common bus 27 for the terminal will be set when a data block is to be transmitted to the retrieval processor 11. Accordingly, the processor 11 initiates the serial train of signals that are transmitted down the transmission line 14 to each of the point of sale terminals 13 for sequential interrogation of each terminal 13. The train of signals transmitted by means of serial transmission line 14 includes address bits, etc. as illustrated in FIG. 9. The data bits that are included in the serial train from the processor 11 will be temporarily stored at the terminals 13 through the operation of the transceiver 25. If the address bits that are stored in the shift register match a selected address header for the particular terminal, the terminal is activated. With the location of a transaction terminal 13 that has a matching address an address enabling signal activates the terminal for decoding the function code bits that have been received and stored. The decoded function code bits determine whether there is going to be a transmission of data back to the retriever processor 11 or whether the data that has been received will be transferred to a particular device identified by means of the function code bits and controlled therefrom. If there is not to be a transmission back to the processor 11 the function code bits that are gated onto the data bus for the common bus 27 of the terminal activate a selected function control circuit for a particular device to operate thereon along with the data that has been received from the processor for executing a particular function. If the decoded function code bit signals that a transmission back to the retrieval processor is required the data from the device that has generated the data bits is gated onto the data bus of bus 27 by the particular device or module and the data is coupled to the shift registers of the transceiver 25 for transmission to the processor 11 by means of the serial transmission line 14. Once the data has been transferred from an activated terminal 13 its transceiver 25 will sit idle until it is once again activated. It should be noted that during these operations that the common bus 27 for a terminal will act as a data transfer agent for all of the data transaction devices that may be included within a particular terminal. Also during this interval it should be noted that the pulse identified as the PLS* is used as a strobe for the intra and inter device data transfer. Before entering into a detailed description of the operation of the system it should be noted that the logic employed in the system is that a ground potential is TRUE signal. As a consequence the common bus for the terminal 13 includes the bus pull up network 29 providing the signal PLS.

Now assuming that the start pulse is generated by the processor 11 at the transceiver 26 and that the signals of FIG. 9 are gated onto the transmission line 14 by means of the network associated with the NAND gates 146–148. Initially a sync signal is generated and transmitted along the line 14 to condition the transreceivers 25 for the terminals 13 for correspondence with the retrieval processor 11. With respect to the structure of the system the sync signal is transmitted down the line 14 and received at a transceiver 25 and applied by means of the data lines X EAT O* and X DAT 1* to the control network illustrated in FIG. 6. During the time interval that a sync signal is on the transmission line the X DAT 1* signal is low and therefor the X DAT 1 signal is TRUE. Accordingly the OR gate 91 is opened which allows the time delay network 93 to integrate the signal over the desired time period depending upon the time constant of the resistor 93R and Capacitor 93C. At the end of the time delay interval, the signal XENA* is obtained. This signal is obtained by the Schmidt trigger 94 detecting the amplitude of its input signal and providing an output in response to detecting the amplitude at the time interval the delay network 93 times out. The complement thereof or the XENA signal will set the transceiver 25 to the transmit, XMIT, mode. This signal is illustrated in FIG. 9 as the XMIT signal. The time interval that this signal is positive determines the time interval in which the data is accepted at the transceiver 25. The integration performed by the time delay network 93, then, is such that when a signal reaches a preselected amplitude and is detected by the Schmidt trigger 94, it will set the flip flop 95 by means of its input to signal the transmission mode for the terminal 13. The flip flop 95 will be set for a furation of the XMIT pulse to allow the 16 bits of data on the line 14 to be received. It will be recalled that the logic of the binary coded bits transmitted along the transmission line is such that the positive pulse defines a bit that is being transmitted for any one bit time and that the complement of the bit is transmitted by the opposite line. Accordingly, at all times one or the other of the transmission lines have a positive pulses thereon. As noted from FIG. 6 these two signals appear on the X DAT 0* and the X DAT 1* signals as received from the outputs of the differential comparators 51 and 52 for the receiving portion of the terminal. For this it will be noted that at the input of the OR circuit 90, both of these signals appear so that a continuous train of signals representative of the total number of signals transmitted along the transmission line 14 will appear at the output of the OR gate 90. In this instance 16 pulses are transmitted and these 16 pulses are counted by the " 16" bit counter 92.

The X DAT* will also set the flip flop 60 and produce the X DAT output signal. The X DAT output signal from the flip flop 60 is applied as an input signal to the bidirectional shift register 45-1 (See FIG. 7). Accordingly, the pulses derived from the transmission line and the differential comparators 51 and 52 are sequentially shifted into the bidirectional shift register 45-1. The pulses that are transmitted may represent the address bits, the function code bits and the data bits transmitted from the processor 11. As illustrated in FIG. 9, the address bits comprise four 1's or the data group 1111. Four function bits are illustrated in FIG. 9 and represent the data group 0001. 6 data bits are illustrated as the bits 000010. Accordingly, after the first four bits are shifted into the shift register 45-1, the most significant bit will be shifted out in response to the fifth input bit on the line 45-0 into the shift register 45-2. This register will accept the next group of bits until all of its registers have been set so that the ninth pulse will be shifted out of the register 45-2 and onto the serial line SERL and shifted into the function register 45-F illustrated in FIG. 8. In the same fashion, the continuous shifting of the transmitted bits into the register 45-F will cause the most significant bit to be shifted out of the register 45-F and onto the line 45-FO for entry into the address register 45-A. In this fashion, when all of the data bits have been shifted into the registers the residence of the bits is such that the address bits that have been transmitted by the line 14 will be stored in the address register 45-A. The function bits will be stored in the function register 45-F. At this point, the data bits will be stored in the two registers 45-1 and 45-2. This shifting is effected by the XFER CLK pulses illustrated in FIG. 9 in time relationship with the information on the transmission line.

With the information transmitted from the line 14 stored in the register 45, the signal derived from the address register 45-A will be logically combined through the address select header 60 at the input of the AND gate 61. With the reception of the "16" bits from the transmission line the bit counter 92 has reached its capacity so that the "8" bit output from the counter 92 resets the flip flop 95. At this point it should be noted that shifting register or sequencing control register 98 is normally preset to the 0 state. With the resetting of the flip flop 95, it is reset at the end of the transmission mode signal, XMIT, signalling the termination of the receipt of data from the processor 11. This is accomplished through the input terminal 98R coupled to the flip flop 95 output. At this interval, then, the clock pulses, CLK, are provided. The clock pulses are provided by means of the master oscillator 28 coupled to the NAND gate 109. The NAND gate 109 receives, in addition to the oscillator signal, the now TRUE signal identified as the RCV control signal which is coupled from the output of the flip flop 95 to cause the oscillator pulses to be gated out as the CLK* pulses. Accordingly, this condition will allow five clock pulses to be applied as the CLK* signal at the corresponding input of the shift register 98. Prior to the arrival of the first clock pulse, the resetting of the register 98 by means of the terminal 98R will cause all of the output terminals of the register 98 to assume a free condition in response to the terminal 98R going high. The first clock pulse, CLK*, causes the output signal ENA to go high. This ENA signal appears at the AND gate 61 in combination with the address signals from the address select header 60. With that signal being in a TRUE condition and if the address select header signals a TRUE condition relative to the signals in the address register 45-A, and at this same time no data is being shifted so that the input conditions for the AND gate 61 are satisfied, a TRUE output signal is provided from the AND gate 61 and which signal is identified as the ADE* signal. The data shift* signal from the NOR gate 99 has two FALSE input signals at this time indicating no data is being shifted. The complement of this signal, the ADE signal is coupled to each of the NAND gates 67–70 in conjunction with the function bit signals appearing at the output of the function registers 45-F. These function bit signals are gated onto the function bus of the common bus 27 for the terminal. The ADE signal is illustrated in FIG. 9.

With the generation of the ADE* signal, it is coupled to the function code decoder 56 to activate it. This decoder is activated for producing decoded function code bits which are identified in FIG. 8 as the CD0, the CD0*, CD1*, etc. bits. With the continued application of the CLK* bits to the register 98 the outputs of the register 98 are sequentially switched to the high state. The outputs become high in the sequence of the output terminals for the register 98, as identified in FIG. 6 in reading from the bottom — ENA, 14, 13, 11, RCV or 10. When the output terminal 13 is in the high state and the output terminal 11 is in the low state, the logic of the NAND gate 100, NOR circuit 101 and the NAND gate 102 is such that the strobe pulse or the PLS* pulse is generated; see FIG. 9. This occurs between the generation of the third and fourth CLK* pulses and assures the circuitry has settled down for the strobe to be effective. as is evident from FIG. 7, this PLS pulse will appear at the input of the registers 45-1, 45-2 and 45-3. With the RCV terminal of the register 98 in the low condition it will appear at the input of the NOR gate 99 to signal a data shift. This signal also appears as an input to the resister 45-1, 45-2 and 45-3. In the event that data has been picked off from the data bus of the common bus of the terminal it will appear at the input of the elements 78–86 associated with the register 45-1, 45-2 and 45-3. At the trailing edge of the PLS pulse this terminal data is loaded into the registers 45-1, 45-2 and 45-3 in a parallel circuit relationship.

At this point, it should be noted that the data that had been stored in the registers 45-1 and 45-2 that has been received from the processor 11 appears at the series of the NAND gates 71–76 through the output signals from the shift registers 45-1 and 45-2. If the decoded function code bits such as the code bits identified at the input to the OR gate 77 are TRUE in accordance with the OR logic the data bits are transferred from the shift registers 45-1 and 45-2 onto the data bus of the common bus 27 for operating a selected device at the terminal as specified by a function cod bit transferred onto the bus 27 by the NAND circuits 67–70.

To obtain the data generated by a particular device such as the keyboard and transmit it back to the processor requires that the transmission control function to effect the transfer. With reference to FIG. 9, it will be noted that the address enabling signal, ADE, has a time duration to allow the five clock pulses to be applied to the register 98. The low state of the ADE signal occurs after the fifth CLK* pulse sets the RCV output of register 98 in the high state. The RCV signal remains low while the other input signal to the OR signal is in a high state so that when RCV goes to a high state, the clock pulses will be terminated unless the flip flop 106 is changed in state. At this same time it will be noted that the transmit signal of the terminal had been terminated along with the XFER CLK signals to terminate the acceptance of signals to the transceiver. With reference to the wave shapes of FIG. 9 it will be noted that the data bit represented as the X DAT line is in the NRZ data format. This indicates that the information is encoded so that if the value of the binary bit is unchanged the signal remaining unchanged as opposed to discrete bits for each data bit interval. If the decoded function code bits are one of the function code bits that signal transmission of the data from the terminal 13 to the processor 11, it will be signalled by the output of the OR gate 107. The decoded bits for signalling a terminal transmission are identified at the input of the OR gate 107. Accordingly, if one of these decoded function codes is TRUE it will set the flip flop 106 and therefore satisfy the input conditions of the NOR gate 108 and the NAND gate 109 to, once again, allow the continuous application of the oscillator signal as clock bits at the terminal 13. These clock bits are identified as the bits in FIG. 9 appearing to the right of the dotted line RC. The transfer clock bits, then, are applied to the control network and counted by the "16" bit counter 92 that was employed for counting the processor data bits. After the bit counter 92 counts to 11, the flip flop 106 will be conditioned for reset by means of the AND gate 104. This occurs due to the reception of the 8-2-1 bits from the output of the counter 92 as the inputs to the AND gate 104. This will reset the flip flop 106 at the 12th clock pulse to provide a TRUE signal at the input of the OR gate 108 and thereby terminate the clock pulses. As is noted in FIG. 9, the clock pulses that are generated after the time interval dilineated by the line RC are the 12th clock pulse necessary for transmitting the data to the retrieval processor 11.

It will be noted with reference to FIG. 7 that with the generation of the XFER CLK pulse applied as inputs to the registers 45-1, 45-2, and 45-3, the data bits transferred into these registers from the terminal will be already shifted out from the registers and serially appear at the output terminal of the register 45-3 identified as the RCV data output. The RCV data signal and its complement RCV data*, therefore, are applied to the NAND circuits 120 and 121 and coupled there through their respect/drivers and voltage protection circuits to the transmission line 14. It will be recognized that the driver pair that is activated depends upon the polarity of the data that is applied to the NAND gates 120 and 121 to conform the data bits to the bits shifted out of the registers 45-3. These data bits then are transmitted back to the processor and received at the processor transceiver 26 for operation and handling at the data processor for the required data execution operations. At this time, then, the transceiver 25 will remain idle until it receives signals once again from the processor 11.

The above operations were discussed in conjunction with the signalling of the transfer of data from a terminal 13 to the processor 11. If a decoded function bit does not signal the transmission of data to the retrieval processor 11, the clock, CLK, pulses will be terminated at the end of the fifth pulse, coincident with the line RC in FIG. 9, in response to the signal RCV at the OR gate 108 going high. Under these programmed conditions, the data bits and the function bits received from the processor 11 will be transferred onto the corresponding buses for the terminal common bus 27 for further handling. The various devices illustrated and described in conjunction with FIG. 2 will be addressed by the received function bit. The electronic control network associated with the addressed device will be responsive to an individual function code bit by means of a decoder. The decoded function code bit will activate the addressed control network for controlling and executing the function of the device in much the same manner as described hereinabove for addressing the keyboard control network 36; for example, if the function code bit addresses the cash drawer control 37. This may be accomplished by assigning the function code bit, FNC14, for this function. This function bit can be "ANDed" with a strobe pulse to gate out a control signal for actuating a relay to unlock the drawer 24. Such a control circuit is more or less conventional. In the same fashion but of greater complexity, the transaction display 23 may be controlled. Considering the numeric display 32 as typical, the control network 31 can be addressed by a group of function code bits and applied to a decoder to produce an emabling signal for the associated signal. This enabling signal can then be employed to control the transfer of the numeric data appearing on the corresponding data bus for the common bus 27 into a memory for the control network 31. The memory can then be read out, the readout signals decoded and employed to actuate a numeric display such as a group of "Nixie" tubes that may be provided for the display 32. The remaining devices may be similarly controlled to execute their particular assigned functions.

What is claimed is:

1. An automatic store transaction system comprising a digital computer having preselected, accessible transaction information recorded therein and capable of executing preselected operations on transaction information, the computer generating a train of binary coded signals including a unique signal for activating a single transaction terminal adapted to respond to the unique signal, a transceiver coupled to said computer for transmitting binary coded signals to and from the computer,
   a terminal for recording store transactions including means for generating binary coded signals representative of a transaction entered therein and means responsive to a unique signal for activating the terminal in response to the reception of the unique signal,
   a transceiver coupled to the terminal for transmitting binary coded signals to and from the terminal, and
   means coupled between said transceivers for transmitting the binary coded signals between the digital computer and the terminal, said means comprising a transmission line system having three transmission lines arranged in a balanced system, the store transactions entered into the terminal being represented by binary coded signals that are transmitted to the digital computer for processing once the terminal is activated in response to the unique signal and the processed data being transmitted back to the transaction terminal for completing the store transaction.

2. An automatic store transaction system as defined in claim 1 wherein three transmission lines are arranged in a common sheath with one of the lines being connected to a point of reference, another one of the transmission lines being adapted for transmitting binary signals with the remaining line transmitting binary signals complementary to the signals on said another line, one signal being transmitted by the binary signal on said another one of the transmission lines and the complementary binary signal on said remaining line.

3. An automatic store transaction system as defined in claim 2 including a second transaction terminal having an individual transceiver coupled in serial relationship with the first mentioned terminal to said transmission lines and including means responsive to a different unique signal than the first mentioned terminal for activating the second terminal in response only to said different unique signal for completing a transaction at the second terminal.

4. An automatic store transaction system comprising
a data processor including means for generating a train of binary coded signals including address signals for selecting one of the transaction terminals for transmission of the binary coded signals to and from the processor,
a plurality of transaction terminals, each terminal having means for generating binary coded signals representative of a transaction entered into the terminal and having circuit means coupled to be responsive to a preselected address signal for activating the terminal and transmitting any transaction signals to the data processor for operation thereon and back to the terminal to complete the transaction,
and a three-wire, balanced transmission line system coupled between the data processor and each of the transaction terminals for transmitting binary coded signals to and from the data processor and the activated transaction terminals.

5. An automatic store transaction system as defined in claim 4 wherein each of the transaction terminals comprises an electronic cash register having keyboard means for entering transaction information therein and generating binary coded signals representative thereof.

6. An automatic store transaction system as defined in claim 5 wherein each of the keyboard means includes means for generating a signal representative of a completed transaction to signal the availability of the keyboard generated signals for processing.

7. An automatic store transaction system as defined in claim 4 wherein said transmission line system includes an individual termination network coupled to the opposite ends thereof.

8. An automatic store transaction system comprising
a retrieval data processor having preselected, accessible transaction information recorded therein and capable of executing preselected operations on the transaction information,
a data transceiver for bidirectionally transmitting data to and from the data processor,
a plurality of transaction terminals, each of the terminals being adapted for generating binary coded signals representative of a transaction entered therein and operating on the binary coded signals received from the data processor once activated,
a corresponding plurality of data transceivers, one for each transaction terminal, coupled to bidirectionally control the transfer of the binary coded signals to and from the individual transaction terminals,
means for serially and bidirectionally transmitting binary coded signals between the data processor and the transaction terminals through the individual data transceivers for the terminals and the processor, said transmission means comprises a three-wire, balanced transmission line system coupled between the data processor transceiver and each of the individual transceivers,
the binary coded signals transmitted from the retrieval data processor includes terminal identification signals for selecting one of the transaction terminals to be activated and terminal function signals and data signals for controlling a preselected function at the selected terminal including transmitting binary coded signals from the terminal to the data processor,
each of said terminals includes circuit means for responding to an individual identification signal for activating the individual terminal and producing a terminal activating signal in response to the reception of said individual identification signal from the processor, and means at said terminal coupled to be responsive to the terminal activating signal for processing any terminal generated binary coded signals for completing a transaction at the activated terminal.

9. An automatic store transaction system as defined in claim 8 wherein each transaction terminal includes temporary storage means for receiving and storing the binary coded signals transmitted thereto from the data processor, and data control networks for operating on the received signals, said control network including means for decoding the stored terminal address signals to determine if the individual address signals match the address of the individual terminal and in the event of a match to produce an address enable signal for activating the individual terminal having a matching address, means for decoding the stored function signals in response to said address enable signal, the decoded function signals controlling a preselected function of the terminal including the transfer of binary coded signals generated at the terminal into said temporary storage means, means for transferring the stored function bits to the terminal in response to the address enable signal, and means for controlling the function of the terminal in response to the decoded function bits including transferring the terminal generated binary coded signals to said temporary storage means, and means for transferring the latter-mentioned stored signals out of the storage means for serial transmission by said transmission means to the data processor.

10. An automatic store transaction system as defined in claim 9 wherein said three-wire system is arranged in a common sheath with one of the lines being connected to a point of reference potential, another one of the transmission line being adapted for transmitting binary coded signals with the remaining line transmitting binary coded signals complementary to the signals on said another line, a single signal being transmitted by the two lines transmitting a binary coded signal and its complement.

11. An automatic store transaction system as defined in claim 10 wherein said three-wire system includes a termination network coupled to the opposite ends of the transmission system.

12. An automatic store transaction system as defined in claim 9 wherein each terminal includes means for displaying the transaction to a customer.

13. An automatic store transaction system as defined in claim 12 wherein the means for displaying the transaction to a customer comprises temporary alpha numeric display means and permanent recording means for recording a completed transaction.

14. An electronic transaction terminal for an automatic store transaction system comprising an electronically controlled transaction terminal capable of a plurality of transaction functions including means for generating binary coded signals representative of a transaction to be completed, each of said plurality of functions is executed by a unique function control device, a corresponding plurality of control networks coupled to be responsive to a preselected function signal for controlling an individual function control device, transceiving circuit means for receiving data signals from an external source to be processed by the transaction terminal and receiving data signals generated at the transaction terminal for transmission to an external device, said transceiving circuit means including means coupled to be responsive to a unique terminal identification signal for activating the terminal upon reception of said identification signal and providing a terminal activating signal at the terminal having a matching identification in response thereto, said transceiving means including means coupled to be responsive to and for storing terminal function control signals received from an external source, a common data bus for the terminal coupled between the terminal transceiving circuit means and the plurality of function control networks for bidirectionally transferring data therebetween, said transceiving means including means coupled to be responsive to data signals received from an external source, control means coupled to said function control signal means for transferring the function control signals to said common data bus, means for decoding the function control signals in response to the coupling of said terminal activating signal thereto, said decoded signals signalling the transmission of data to a terminal control device or the transfer of data from a terminal control device, said control network including means coupled to a decoded function signal for transferring data from a control device having data signals generated thereat and appearing on the common data bus to said transceiving circuit means for transmission to an external source, and means coupled to a decoded function signal for transferring the received data signals to said common bus, said control network responsive to said preselected function signal being operative on the data on said common bus for controlling the operation of the individual control device coupled thereto for executing the function thereof.

* * * * *

UNITED STATES PATENT AND TRADEMARK OFFICE
CERTIFICATE OF CORRECTION

PATENT NO. : 3,899,775
DATED : Aug. 12, 1975
INVENTOR(S) : John M. Larsen

It is certified that error appears in the above-identified patent and that said Letters Patent are hereby corrected as shown below:

Column 3, line 53, "receiver" should read --retrieval--.
Column 4, line 4, "termial" should read --terminal--. Column 5, line 6, "siganal" should read --signal; line 11, "tranasction" should read --transaction--; line 15, "delimieter" should read --delimiter--. Column 7, line 64, "process" should read --processor--. Column 9, line 40, "entering" should read --entered--. Column 11, line 24, "transmission" (second occurrence) should read --transaction--; line 27 "embployed" should read --employed--. Column 12, line 19, before "counter" insert --bit--. Column 14, line 1, "singals" should read --signals--; line 9, "employment" should read --complement--; line 47, "tranmmit" should read --transmit--. Column 17, line 11, after "together and" insert --to--; line 24, "volage" should read --voltage--. Column 18, line 48, after "164" delete "detect" and add --also--; line 52, delete "first" and substitute --detect--. Column 20, line 53, "For" should read "From". Column 22, line 31, "resister" should read --register--; line 48, "cod" should read --code--. Column 24, line 61, after "reference" insert --potential--. Column 26, line 51, "line" should read --lines--.

Signed and Sealed this seventeenth Day of February 1976

[SEAL]

Attest:

RUTH C. MASON
Attesting Officer

C. MARSHALL DANN
Commissioner of Patents and Trademarks